United States Patent
Pellerin et al.

(10) Patent No.: US 11,823,095 B2
(45) Date of Patent: Nov. 21, 2023

(54) MAXIMAL AVAILABILITY INVENTORY

(71) Applicant: Amadeus S.A.S., Biot (FR)

(72) Inventors: Florent Pellerin, Antibes (FR); Benoit Lardeux, Roquefort les Pins (FR); Antoine Cheinet, Grasse (FR); Bruno Mousli, Antibes (FR); Thierry Delahaye, Nice (FR); Mourad Boudia, Antibes (FR); Vincent Bossert, Antibes (FR); Fabien Mourgues, Roquefort les Pins (FR)

(73) Assignee: Amadeus S.A.S., Biot (FR)

( * ) Notice: Subject to any disclaimer, the term of this patent is extended or adjusted under 35 U.S.C. 154(b) by 473 days.

(21) Appl. No.: 16/615,313

(22) PCT Filed: Dec. 6, 2017

(86) PCT No.: PCT/EP2017/081624
§ 371 (c)(1),
(2) Date: Nov. 20, 2019

(87) PCT Pub. No.: WO2018/224176
PCT Pub. Date: Dec. 13, 2018

(65) Prior Publication Data
US 2020/0167700 A1    May 28, 2020

Related U.S. Application Data

(60) Provisional application No. 62/517,390, filed on Jun. 9, 2017.

(51) Int. Cl.
*G06Q 40/00*    (2023.01)
*G06Q 10/02*    (2012.01)
(Continued)

(52) U.S. Cl.
CPC ........ *G06Q 10/02* (2013.01); *G06F 16/2379* (2019.01); *G06F 16/285* (2019.01)

(58) Field of Classification Search
None
See application file for complete search history.

(56) References Cited

U.S. PATENT DOCUMENTS

2002/0082878 A1    6/2002    Boies et al.
2008/0221967 A1*   9/2008    Jensen ............... G06Q 30/0202
                                                              705/400
(Continued)

FOREIGN PATENT DOCUMENTS

EP    1840806 A1 *   10/2007   ............. G06Q 10/02
EP    1840806 A1     10/2007
EP    2423862 A1     2/2012

OTHER PUBLICATIONS

Canadian Intellectual Property Office, Official Action dated Aug. 5, 2021 in Application No. 3,064,988.
(Continued)

*Primary Examiner* — Olabode Akintola
(74) *Attorney, Agent, or Firm* — Thompson Hine LLP

(57) ABSTRACT

Virtualization methods and systems for optimizing the availability of items in an inventory of items in a reservation system, wherein the items are classified into item types and an item type is defined by a requestable set of at least one characteristic. Reservations may be received for a set of at least one characteristic that is a subset of an item type. After a reservation has been accepted, all the availabilities of the requestable sets of at least one characteristic in the inventory are updated. The reservation system may be a hotel reservation system and item types may be hotel room types or
(Continued)

other bookable products. The reservation system may be a flight reservation system and item types may be bookable places on flights.

20 Claims, 35 Drawing Sheets

(51) Int. Cl.
*G06F 16/23* (2019.01)
*G06F 16/28* (2019.01)

(56) References Cited

U.S. PATENT DOCUMENTS

| | | | |
|---|---|---|---|
| 2009/0307020 A1* | 12/2009 | Viale | G06Q 10/0637 705/28 |
| 2012/0053968 A1 | 3/2012 | Debarge et al. | |
| 2016/0328662 A1 | 11/2016 | Vinod et al. | |
| 2018/0357574 A1 | 12/2018 | Pellerin et al. | |

OTHER PUBLICATIONS

European Patent Office, International Search Report and Written Opinion issued in International Application No. PCT/EP2017/081624 dated Jan. 12, 2018.
IP Australia, Examination Report issued in Application No. 2017417562 dated Jul. 13, 2021.
USPTO, Notice of Allowance dated Sep. 18, 2020 in U.S. Appl. No. 16/001,462.
Day et al., "Improving patient flow in a hospital through dynamic allocation of cardiac diagnostic testing time slots", Decision Support Systems, vol. 49, Issue 4, Nov. 2010, pp. 463-473.
K. Miyashita, K. Masuda and F. Higashitani, "Coordinated Service Allocation through Flexible Reservation," in IEEE Transactions on Services Computing, vol. 1, No. 2, pp. 117-128, Apr.-Jun. 2008.
USPTO, Office Action dated May 6, 2020 in U.S. Appl. No. 16/001,462.
USPTO, Office Action dated Oct. 17, 2019 in U.S. Appl. No. 16/001,462.
USPTO, Office Action dated Jan. 31, 2019 in U.S. Appl. No. 16/001,462.
Office Action dated Aug. 8, 2018 in U.S. Appl. No. 16/001,462.
Japan Patent Office, Official Action dated Jun. 14, 2021 in Application No. 2019-567543, and translation thereof.

* cited by examiner

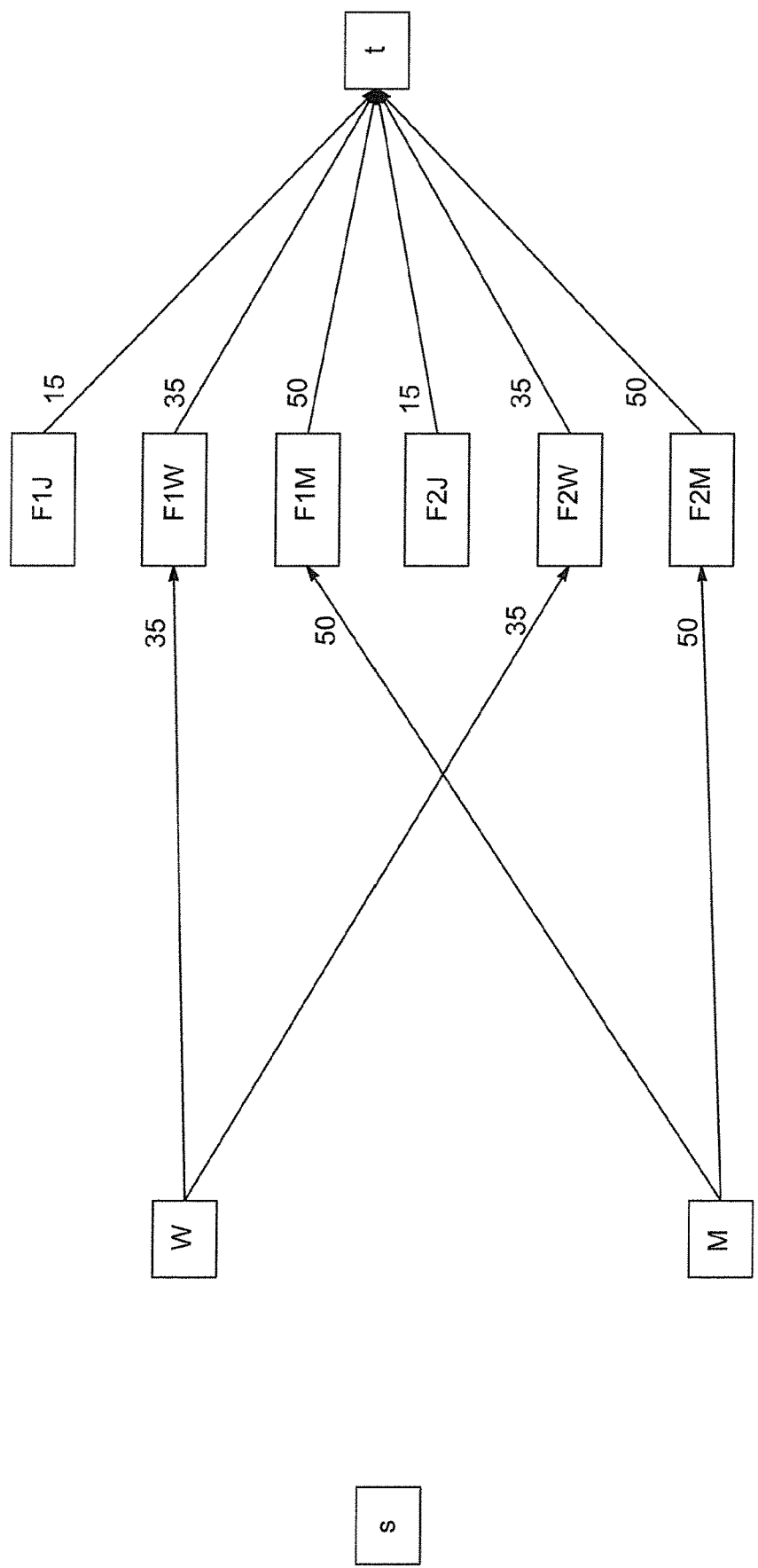

|      | s | t | W | M | F1J | F1W | F1M | F2J | F2W | F2M |
|------|---|---|---|---|-----|-----|-----|-----|-----|-----|
| F2M  | 0 | 0 | 0 | 50 | 0  | 0   | 0   | 0   | 0   | 0   |
| F2W  | 0 | 0 | 35 | 0 | 0  | 0   | 0   | 0   | 0   | 0   |
| F2J  | 0 | 0 | 0 | 0 | 0   | 0   | 0   | 0   | 0   | 0   |
| F1M  | 0 | 0 | 0 | 50 | 0  | 0   | 0   | 0   | 0   | 0   |
| F1W  | 0 | 0 | 35 | 0 | 0  | 0   | 0   | 0   | 0   | 0   |
| F1J  | 0 | 0 | 0 | 0 | 0   | 0   | 0   | 0   | 0   | 0   |
| M    | 0 | 0 | 0 | 0 | 0   | 0   | 0   | 0   | 0   | 0   |
| W    | 0 | 0 | 0 | 0 | 0   | 0   | 0   | 0   | 0   | 0   |
| t    | 0 | 0 | 0 | 0 | 15  | 35  | 50  | 15  | 35  | 50  |
| s    | 0 | 0 | 0 | 0 | 0   | 0   | 0   | 0   | 0   | 0   |

| | s | t | W | M | F1J | F1W | F1M | F2J | F2W | F2M |
|---|---|---|---|---|---|---|---|---|---|---|
| F2M | 49 | 0 | 0 | 50 | 0 | 0 | 0 | 0 | 0 | 0 |
| F2W | 28 | 0 | 35 | 0 | 0 | 0 | 0 | 0 | 0 | 0 |
| F2J | 14 | 0 | 0 | 0 | 0 | 0 | 0 | 0 | 0 | 0 |
| F1M | 47 | 0 | 0 | 50 | 0 | 0 | 0 | 0 | 0 | 0 |
| F1W | 33 | 0 | 35 | 0 | 0 | 0 | 0 | 0 | 0 | 0 |
| F1J | 7 | 0 | 0 | 0 | 0 | 0 | 0 | 0 | 0 | 0 |
| M | 0 | 0 | 0 | 0 | 0 | 0 | 0 | 0 | 0 | 0 |
| W | 0 | 0 | 0 | 0 | 0 | 0 | 0 | 0 | 0 | 0 |
| t | 0 | 0 | 0 | 0 | 15 | 35 | 50 | 15 | 35 | 50 |
| s | 0 | 0 | 0 | 0 | 0 | 0 | 0 | 0 | 0 | 0 |

Fig. 21b

| | s | t | W | M | F1J | F1W | F1M | F2J | F2W | F2M |
|---|---|---|---|---|---|---|---|---|---|---|
| F2M | 0 | 49 | 0 | 50 | 0 | 0 | 0 | 0 | 0 | 0 |
| F2W | 0 | 28 | 35 | 0 | 0 | 0 | 0 | 0 | 0 | 0 |
| F2J | 0 | 14 | 0 | 0 | 0 | 0 | 0 | 0 | 0 | 0 |
| F1M | 0 | 47 | 0 | 50 | 0 | 0 | 0 | 0 | 0 | 0 |
| F1W | 0 | 33 | 35 | 0 | 0 | 0 | 0 | 0 | 0 | 0 |
| F1J | 0 | 7 | 0 | 0 | 0 | 0 | 0 | 0 | 0 | 0 |
| M | 0 | 0 | 0 | 0 | 0 | 0 | 0 | 0 | 0 | 0 |
| W | 0 | 0 | 0 | 0 | 0 | 0 | 0 | 0 | 0 | 0 |
| t | 0 | 0 | 0 | 0 | 8 | 2 | 3 | 1 | 7 | 1 |
| s | 0 | 0 | 0 | 0 | 7 | 33 | 47 | 14 | 28 | 49 |
| | s | t | W | M | F1J | F1W | F1M | F2J | F2W | F2M |

Fig. 22b

| | s | t | W | M | F1J | F1W | F1M | F2J | F2W | F2M |
|---|---|---|---|---|---|---|---|---|---|---|
| F2M | 0 | 49 | 0 | 50 | 0 | 0 | 0 | 0 | 0 | 0 |
| F2W | 0 | 35 | 28 | 0 | 0 | 0 | 0 | 0 | 0 | 0 |
| F2J | 0 | 14 | 0 | 0 | 0 | 0 | 0 | 0 | 0 | 0 |
| F1M | 0 | 47 | 0 | 50 | 0 | 0 | 0 | 0 | 0 | 0 |
| F1W | 0 | 35 | 33 | 0 | 0 | 0 | 0 | 0 | 0 | 0 |
| F1J | 0 | 7 | 0 | 0 | 0 | 0 | 0 | 0 | 0 | 0 |
| M | 0 | 0 | 0 | 0 | 0 | 0 | 0 | 0 | 0 | 0 |
| W | 0 | 0 | 0 | 0 | 0 | 2 | 0 | 0 | 7 | 0 |
| t | 0 | 0 | 0 | 0 | 8 | 0 | 3 | 1 | 0 | 1 |
| s | 0 | 0 | 0 | 0 | 7 | 33 | 47 | 14 | 28 | 49 |

|   | s | t | W | M | F1J | F1W | F1M | F2J | F2W | F2M |
|---|---|---|---|---|---|---|---|---|---|---|
| F2M | 0 | 0 | 0 | 0 | 0 | 0 | 0 | 0 | 0 | 0 |
| F2W | 0 | 0 | 0 | 0 | 0 | 0 | 0 | 0 | 0 | 0 |
| F2J | 0 | 0 | 0 | 0 | 0 | 0 | 0 | 0 | 0 | 0 |
| F1M | 0 | 0 | 0 | 0 | 0 | 0 | 0 | 0 | 0 | 0 |
| F1W | 0 | 0 | 0 | 0 | 0 | 0 | 0 | 0 | 0 | 0 |
| F1J | 0 | 0 | 0 | 0 | 0 | 0 | 0 | 0 | 0 | 0 |
| M | 50 | 50 | 0 | 0 | 0 | 0 | 0 | 0 | 0 | 0 |
| W | 35 | 0 | 35 | 0 | 0 | 0 | 0 | 0 | 0 | 0 |
| t | 49 | 28 | 14 | 47 | 33 | 7 | 0 | 2 | 0 | 0 |
| s | 0 | 0 | 0 | 0 | 0 | 0 | 0 | 0 | 0 | 0 |



| | s | t | W | M | F1J | F1W | F1M | F2J | F2W | F2M |
|---|---|---|---|---|---|---|---|---|---|---|
| s | 0 | 0 | 0 | 0 | 0 | 0 | 0 | 0 | 0 | 0 |
| t | 0 | 0 | 0 | 0 | 15 | 35 | 50 | 15 | 35 | 50 |
| W | 2 | 0 | 0 | 0 | 0 | 0 | 0 | 0 | 0 | 0 |
| M | 0 | 0 | 0 | 0 | 0 | 0 | 0 | 0 | 0 | 0 |
| F1J | 7 | 0 | 0 | 0 | 0 | 0 | 0 | 0 | 0 | 0 |
| F1W | 33 | 0 | 35 | 0 | 0 | 0 | 0 | 0 | 0 | 0 |
| F1M | 47 | 0 | 0 | 50 | 0 | 0 | 0 | 0 | 0 | 0 |
| F2J | 14 | 0 | 0 | 0 | 0 | 0 | 0 | 0 | 0 | 0 |
| F2W | 28 | 0 | 35 | 0 | 0 | 0 | 0 | 0 | 0 | 0 |
| F2M | 49 | 0 | 0 | 50 | 0 | 0 | 0 | 0 | 0 | 0 |

| | s | t | W | M | F1J | F1W | F1M | F2J | F2W | F2M |
|---|---|---|---|---|---|---|---|---|---|---|
| s | 0 | 0 | 2 | 0 | 7 | 33 | 47 | 14 | 28 | 49 |
| t | 0 | 0 | 0 | 0 | 8 | 0 | 3 | 1 | 7 | 1 |
| W | 0 | 0 | 0 | 0 | 0 | 2 | 0 | 0 | 0 | 0 |
| M | 0 | 0 | 0 | 0 | 0 | 0 | 0 | 0 | 0 | 0 |
| F1J | 0 | 7 | 0 | 0 | 0 | 0 | 0 | 0 | 0 | 0 |
| F1W | 0 | 35 | 33 | 0 | 0 | 0 | 0 | 0 | 0 | 0 |
| F1M | 0 | 47 | 0 | 50 | 0 | 0 | 0 | 0 | 0 | 0 |
| F2J | 0 | 14 | 0 | 0 | 0 | 0 | 0 | 0 | 0 | 0 |
| F2W | 0 | 28 | 33 | 0 | 0 | 0 | 0 | 0 | 0 | 0 |
| F2M | 0 | 49 | 0 | 50 | 0 | 0 | 0 | 0 | 0 | 0 |

|     | s | t | W | M | F1J | F1W | F1M | F2J | F2W | F2M |
|-----|---|---|---|---|-----|-----|-----|-----|-----|-----|
| F2M | 0 | 49 | 0 | 50 | 0 | 0 | 0 | 0 | 0 | 0 |
| F2W | 0 | 35 | 26 | 0 | 0 | 0 | 0 | 0 | 0 | 0 |
| F2J | 0 | 14 | 0 | 0 | 0 | 0 | 0 | 0 | 0 | 0 |
| F1M | 0 | 47 | 0 | 50 | 0 | 0 | 0 | 0 | 0 | 0 |
| F1W | 0 | 35 | 33 | 0 | 0 | 0 | 0 | 0 | 0 | 0 |
| F1J | 0 | 7 | 0 | 0 | 0 | 0 | 0 | 0 | 0 | 0 |
| M | 0 | 0 | 0 | 0 | 0 | 0 | 0 | 0 | 0 | 0 |
| W | 0 | 0 | 0 | 0 | 0 | 2 | 0 | 0 | 7 | 0 |
| t | 0 | 0 | 0 | 0 | 8 | 0 | 3 | 1 | 0 | 1 |
| s | 0 | 0 | 2 | 0 | 7 | 33 | 47 | 14 | 28 | 49 |

|   | s | t | W | M | F1J | F1W | F1M | F2J | F2W | F2M |
|---|---|---|---|---|-----|-----|-----|-----|-----|-----|
| s | 0 | 0 | 2 | 0 | 7 | 33 | 47 | 14 | 28 | 49 |
| t | 0 | 0 | 0 | 0 | 8 | 2 | 3 | 1 | 5 | 1 |
| W | 0 | 0 | 0 | 0 | 0 | 0 | 0 | 0 | 2 | 0 |
| M | 0 | 0 | 0 | 0 | 0 | 0 | 0 | 0 | 0 | 0 |
| F1J | 0 | 7 | 0 | 0 | 0 | 0 | 0 | 0 | 0 | 0 |
| F1W | 0 | 33 | 33 | 0 | 0 | 0 | 0 | 0 | 0 | 0 |
| F1M | 0 | 47 | 0 | 50 | 0 | 0 | 0 | 0 | 0 | 0 |
| F2J | 0 | 14 | 0 | 0 | 0 | 0 | 0 | 0 | 0 | 0 |
| F2W | 0 | 30 | 31 | 0 | 0 | 0 | 0 | 0 | 0 | 0 |
| F2M | 0 | 49 | 0 | 50 | 0 | 0 | 0 | 0 | 0 | 0 |

MAXIMAL AVAILABILITY INVENTORY

TECHNICAL FIELD

The present invention generally relates to computerised inventories, and in particular, to methods and systems for optimizing the availability of the items in an inventory of items, as well as related computer program products.

BACKGROUND

The embodiments of the invention address a problem faced by every instance, either person or system, managing an inventory. One may consider an hotelier, for example, running a hotel with eight rooms each fitting a specific type (known as a room type) such as described on the configuration table below. The hotelier receives reservation requests with different criteria and tries to accept a maximal number of requests by allocating them one by one to a room type that contains as many of the criteria as possible of the respective reservation request. The exercise becomes complicated after a number of reservations have been accepted and allocated to room types. When a new reservation arrives, in order to fit it in, one or more reservations might need to be reallocated for the hotelier to meet as many criteria as possible, and this might become very complex, especially as the number of room types increases.

| Room type | Number |
| --- | --- |
| low-floor, city-view, smoking | 1 |
| low-floor, city-view, non-smoking | 1 |
| low-floor, ocean-view, smoking | 1 |
| low-floor, ocean-view, non-smoking | 1 |
| high-floor, city-view, smoking | 1 |
| high-floor, city-view, non-smoking | 1 |
| high-floor, ocean-view, smoking | 1 |
| high-floor, ocean-view, non-smoking | 1 |

Classic computerized reservation systems have tried to optimize the management of inventories. A person may access the graphical user interface of a hotel reservation system to search for an ocean-view, non-smoking room. In an example, one may suppose that no reservations have been accepted yet. The availabilities of the room types hence correspond to their full number, as defined in the configuration table. Upon receiving a reservation request for an ocean-view, non-smoking room, the inventory system checks the availability. Considering the configuration described by the table above, two room types meet the criteria "ocean view"+"non-smoking". The room types are listed, and the person may choose one and perform a reservation. The inventory system then reduces the availability of the room type by one. The inventory as described by the configuration table above has one room with the characteristics "high-floor"+"ocean-view"+"non-smoking". This room can satisfy 7 different requests, namely a request for "high-floor", a request for "ocean-view", a request for "non-smoking", a request for "high-floor"+"ocean-view", a request for "high-floor"+"non-smoking", a request for "ocean-view"+"non-smoking", or a request for "high-floor"+"ocean-view"+"non-smoking". If the system allocates the room "low-floor"+"ocean-view"+"non-smoking" to a reservation request for "ocean-view"+"non-smoking", future requests for "low-floor"+"ocean-view"+"non-smoking" can no longer be satisfied.

In patent application Ser. No. 09/747,815 "Airline reservation system that supports guaranteed reservations for a preferred category of seating" from Boies et al., a solution is presented in the field of airline reservation. A method is described for receiving a request for a preferred category of seating, determining if the preferred category of seating is available, guaranteeing the preferred category of seating, and assigning a passenger to a seat within the guaranteed category of seating. The passenger can be reassigned to a different seat within the guaranteed category of seating in order to accommodate an additional seating request. Accommodating a new request may have a cascading effect and involve many reassignments. This may not be problematic for a relatively simple inventory such as a seatmap of an airplane, but in more complex inventory systems (such as thousands of rooms of a hotel chain), accommodating a new request may require a huge amount of computing time and thus not be feasible. Moreover, this approach can be costly, since the reassignment of a reservation involves a cancellation transaction and a rebooking transaction. It becomes even more complicated when we consider the sales of opaque travel products. An opaque product is a product with some unknown or hidden characteristics. In the case of an opaque flight, hidden characteristics can for example be the airline that will be operating the flight, the travel dates or the destination, or a combination of these characteristics. An example of an opaque air product could be an Air France flight from Paris to a coastal city in Southern Europe on June 15 and returning on June 29. The traveler who buys this product does not know the time of departure, nor the precise destination (until much closer to the date). The opaque product may correspond to four flights leaving from two airports in Paris on June 15. Existing inventory control systems do not allow the management of an inventory of opaque products in an effective way, as they do assign a physical item to the reservation of an opaque product and thus affect the standard inventory. This can lead to a situation where inventory resources are not optimally exploited. Reassignment is possible when a new reservation is received but, as mentioned above, it may imply a cascading effect and involve many transactions, which increases processing load. Moreover, each chosen allocation impacts the airline revenue management system that optimizes the overall airline revenue, and the revenue management system may get distorted by the provisional allocations.

These examples show the need for improved systems, methods and computer program products for managing an inventory.

SUMMARY

The present invention aims to overcome the drawbacks intrinsic to the systems described above by enabling a virtualization of an inventory in a computerized reservation system. A significant benefit is that the flexibility of resource management involved by the virtual layer allows to create many more different products that use inventory resources. This means that users may select items based on a larger number of characteristics than in traditional inventories.

More specifically, the invention relates to a virtualization method for optimizing, through a client-server processing system, the availability of items in an inventory of items in a reservation system, the items being classified into item types, the method including the steps of:

(1) the server receiving a list of items and the corresponding item types;

(2) the server defining the item types as requestable sets of at least one characteristic;

(3) the server receiving a reservation request for a set of at least one characteristic;

(4) the server computing the availability of the requested set;

(5) the server, if the requested set is available, accepting the reservation request and updating the availabilities of the requestable sets taking into account the accepted reservation;

the server, if the requested set is not available, declining the reservation request;

(6) the server, iterating steps (3) to (5) for subsequent reservation requests for requestable sets.

By considering an inventory as a collection of requestable sets of characteristics, items no longer need to be allocated to reservations at request time. Reservations can actually be received for requestable sets of characteristics. A consequence is that reassignments are not required when new reservations need to be accommodated. When a reservation for a set of characteristics is requested, the availability of the requested set is computed in a way that its availability is maximized. This is done by minimizing the impact of previously accepted reservations. The availability of the items in the inventory is thus maximized compared to the state of the art. Whereas, in a conventional reservation system, when the inventory is large and many reservations have been accepted, the number of calculations becomes huge when a new reservation needs to be accommodated, this is not so in a system according to the invention. The number of degrees of freedom could be considered to be inversely proportional to the number of reservations that have been accepted. The more reservations that have been accepted, the quicker a new reservation is accommodated—or declined. The processing load is significantly reduced and optimal availability of the items within the inventory is ensured.

According to an embodiment of the invention, requestable sets include: sets of characteristics defining item types; and other predefined sets of characteristics. The manager or administrator of the inventory may define sets of characteristics that are possible, which enables a flexible management of the inventory.

According to an embodiment of the invention, a predefined set of characteristics is a subset of a set of characteristics defining an item type. A reservation may thus be received for a predefined set of characteristics that refers to multiple item types. The advantage of defining reservations this way is that more sets of characteristics remain available for subsequent reservations.

According to an embodiment of the invention, the method comprises communication with a configuration system through which the inventory of items is defined, wherein the communication comprises:

the server receiving a predefined list of requestable sets of at least one characteristic that are subsets of the defined sets of at least one characteristic; and the method comprises:

the server computing initial availabilities of the received requestable sets.

According to an embodiment of the invention, the method comprises identifying, from the list of requestable sets, requestable subsets that comprise fewer requestable characteristics than all the requestable characteristics of an item type, wherein the availability computation of a requestable set c includes the steps of:

(1) constructing a graph of N nodes, wherein N=2+ number of item types+number of requestable subsets, and the graph is composed of a source node s, a target node t, a node (n) per item type n and a node (m) per requestable subset of characteristics m;

(2) initializing the graph by:

for each item type n, creating an arc from node (n) to target node t, with a capacity equal to the capacity of the set of characteristics of item type n;

for each requestable subset m:

enumerating item types k containing the requestable subset m;

creating, for each item type k, an arc from node (m) to node (k) with a capacity equal to the capacity of the set of characteristics of item type k;

(3) for each requestable set z, if reservation requests have been accepted, updating the graph with the accepted reservations, by creating an arc from source node s to node (z) with capacity equal to the number of reservations for the requestable set z;

(4) running a maximum flow algorithm from source node s to target node t and adding the reverse flow on the graph;

(5) running an iterative maximum flow from node (c) to target node t and measuring the incremental flow created, comprising the steps of:

while there is a path between node (c) and target node t, increasing flow j on the path;

summing all the flows j, resulting in the availability f of the requestable set c.

Modelling using a graph gives a first advantage of enabling a visualization of the problem to be solved. Moreover, the main problem structure is reflected by a model from which efficient algorithms, leveraging on graph properties, can be applied. To represent an inventory of items on a graph and to compute the availability of a requestable set of characteristics with the maximum flow algorithm makes the management of the inventory light and fast. The maximum flow algorithm is scalable for computing availabilities of complex inventories. Manipulating a graph does not require much processing power. Since availabilities are so easy to compute in this system, they can be recomputed at any moment and need not be stored for later use, which represents a cost.

According to an embodiment of the invention, accepting a reservation request with party size p for a set c and updating the availabilities of the requestable sets taking into account the accepted reservations comprises the steps of:

(1) incrementing the number of reservations in the reservation database for requestable set c by p;

(2) constructing a graph of N nodes, wherein N=2+ number of item types+number of requestable subsets, and the graph is composed of a source node s, a target node t, a node (n) per item type n and a node (m) per requestable subset of characteristics m;

(3) initializing the graph by:

for each item type n, creating an arc from node (n) to target node t, with a capacity equal to the capacity of the set of characteristics of item type n;

for each requestable subset m:

enumerating the item types k containing the requestable subset m;

creating, for each item type k, an arc from node (m) to node (k) with a capacity equal to the capacity of the set of characteristics of item type k;

(4) retrieving the reservations from the reservation database 125 and updating the graph with the accepted reservations, by, for each requestable set j with a number of reservations q, creating an arc from source node s to node (j) with capacity q;

(5) running a maximum flow algorithm from source node s to target node t and adding the reverse flow on the graph;

(6) for each requestable set i:
  (i) running an iterative maximum flow from node (i) to target node t and measuring the incremental flow created, comprising the steps of:
    while there is a path between node (i) and target node t, increasing flow g on the path;
    summing all the flows g, resulting in availability f of the requestable set i;
  (ii) while i is not the last requestable set for which the availability is to be computed, running an iterative bounded flow capped by the availability f between target node t and node (i), comprising increasing flows on at least one path from target node t to node (i) up to availability f.

The inventors found that the same graph can be manipulated to compute all the availabilities. Indeed, by running an iterative bounded flow after the availability computation of a requestable set of characteristics, the graph can be brought back in a state that allows the availability computation of another requestable set. This manipulation is not conventional and contributes to the efficiency of the solution.

According to an embodiment of the invention, the graph is optimized in number of arcs by having requestable subset nodes connecting with arcs to requestable subset nodes.

According to an embodiment of the invention, the graph has the capacity set on the nodes instead of the arcs, or on both.

According to an embodiment of the invention, the graph is stored in memory as a capacity matrix.

According to an embodiment of the invention, the reservation system is a hotel reservation system and item types are hotel room types or other bookable products. Inventories of hotel reservation systems may comprise hundreds of rooms and rooms may be defined by multiple characteristics. This solution overcomes the complicated problem of having to reassign existing reservations when new reservations need to be reaccommodated.

According to an embodiment of the invention, the reservation system is a flight reservation system and item types are bookable places on flights. Inventory resources may be optimally exploited by including opaque products. Since physical items are not allocated to the reservations, no reassignments are needed when a new reservation is received and the airline revenue management system remains unaffected. Avoiding the noise generated by repeated reservations and cancellations contributes to the robustness of the demand forecast computed by the revenue management system, increasing its quality.

The present invention further relates to a computer system configured to perform the method of the invention.

The present invention also relates to a computer program having instructions which, when executed by a computing device or system, cause the computing device or system to perform the method of the invention.

BRIEF DESCRIPTION OF THE DRAWINGS

The accompanying drawings, which are incorporated in and constitute a part of this specification, illustrate various exemplary embodiments of the invention and, together with the general description of the invention given above, and the detailed description of the embodiments given below, serve to explain the embodiments of the invention.

FIG. 19a shows an exemplary graph initialized with configuration data from FIG. 6.

FIG. 19b shows the capacity matrix corresponding to the graph of FIG. 19a.

FIG. 20b shows the capacity matrix corresponding to the graph of FIG. 20a.

FIG. 21b shows the capacity matrix corresponding to the graph of FIG. 21a.

FIG. 22b shows the capacity matrix corresponding to the graph of FIG. 22a.

FIG. 23b shows the capacity matrix corresponding to the graph of FIG. 23a.

FIG. 24b shows the capacity matrix corresponding to the graph of FIG. 24a.

FIG. 25b shows the capacity matrix corresponding to the graph of FIG. 25a.

FIG. 26b shows the capacity matrix corresponding to the graph of FIG. 26a.

DETAILED DESCRIPTION

Figure 1:
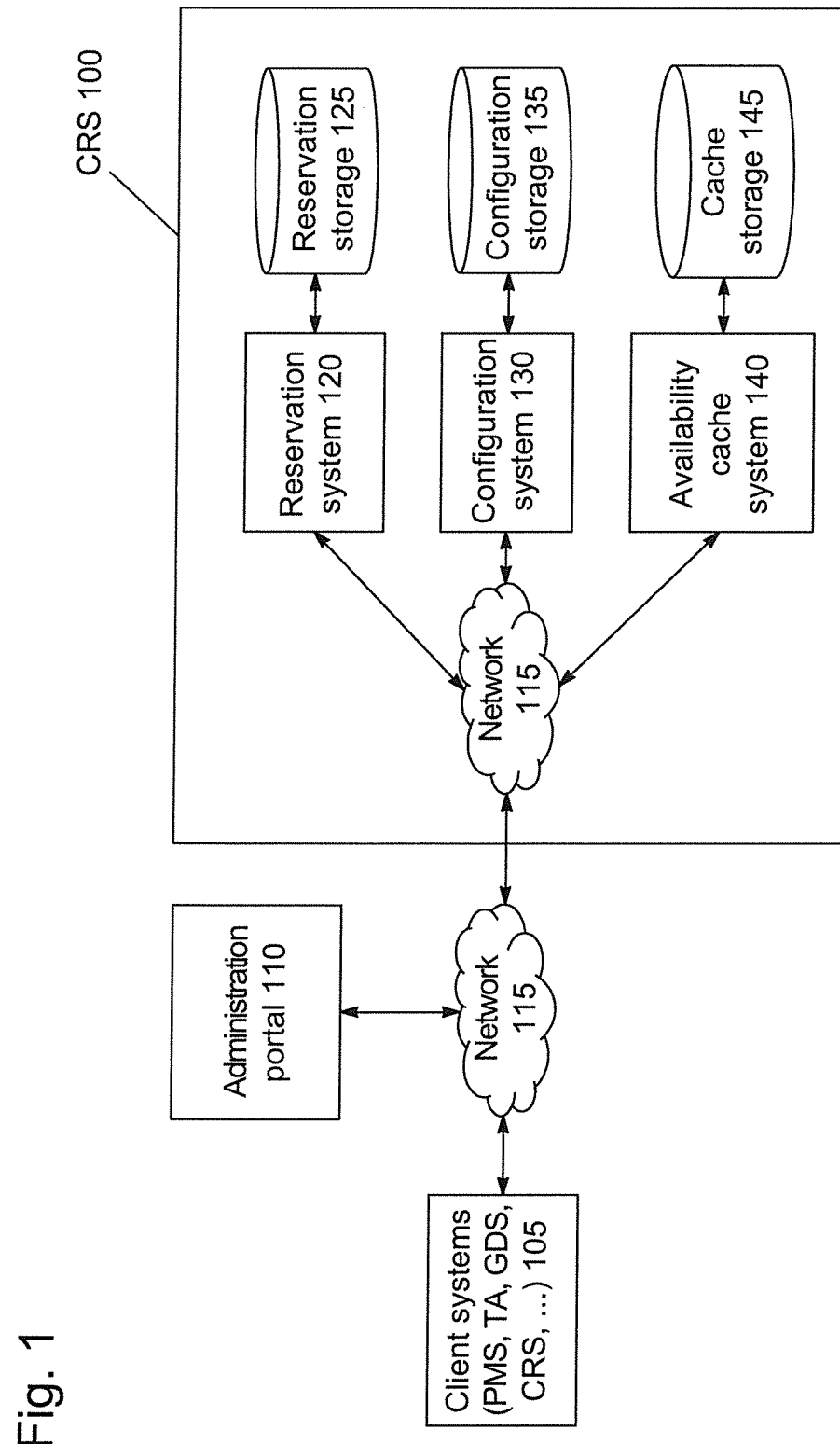
FIG. 1 is a diagrammatic view of an exemplary operating environment for performing reservations for travel products, including a central reservation system 100.

Referring now to FIG. 1, an operating environment in accordance with an embodiment of the invention includes a central reservation system 100 (CRS) for performing reservations for travel products, an administration portal 110 and one or more client systems 105, in communication via a network 115. A client system 105 may be a property management system, a travel agency system, a global distribution system or another central reservation system. The administration portal 110 provides an interface for updating the CRS 100, for example for adding or deleting hotels or flights. The CRS 100 includes a reservation system 120, a configuration system 130 and an availability cache system 140. Each of these three systems communicates with a database and they are interconnected through a network 115. The configuration system 130 is used by an administrator of the CRS 100 through a client application to configure for example hotels or flights. The parameters that enable the configuration are stored in the configuration database 135. Applied to a hotel CRS 100 for example, the configuration system 130 may be used to list the rooms and their room types, the number of rooms per room type and the pricing settings. Applied to an airline CRS 100, the configuration system 130 may be used to create the seatmap of a specific flight, i.e. to list the booking classes and an authorization level or number of seats per booking class. A traveler may use a client system 105 such as the web interface of a travel agency system to get access to a CRS 100 and search for a travel product. The travel products displayed to the user are retrieved from the availability cache system 140. The availability cache system 140 stores the availability of all the sellable products in cache memory 145, thus enabling a fast access. Zones of the cache may be refreshed when reservation or reservation requests are received and accepted affecting the availability of the sellable products. The traveler may select a travel product and decide to book it. A reservation request is sent to the reservation system 120. The reservation system 120 checks if a travel product corresponding to the requested criteria is available, confirms the reservation when possible, stores the reservation in the reservation database 125, recomputes the availabilities of the sellable products and sends the updated values to the availability cache system 140. To clarify the embodiments of the invention, the example of airlines and hotels will be further elaborated in this description, but the embodiments of the invention are not limited to central reservation systems 100 for flights or hotel rooms and can include any computerized inventory.

Figure 2:
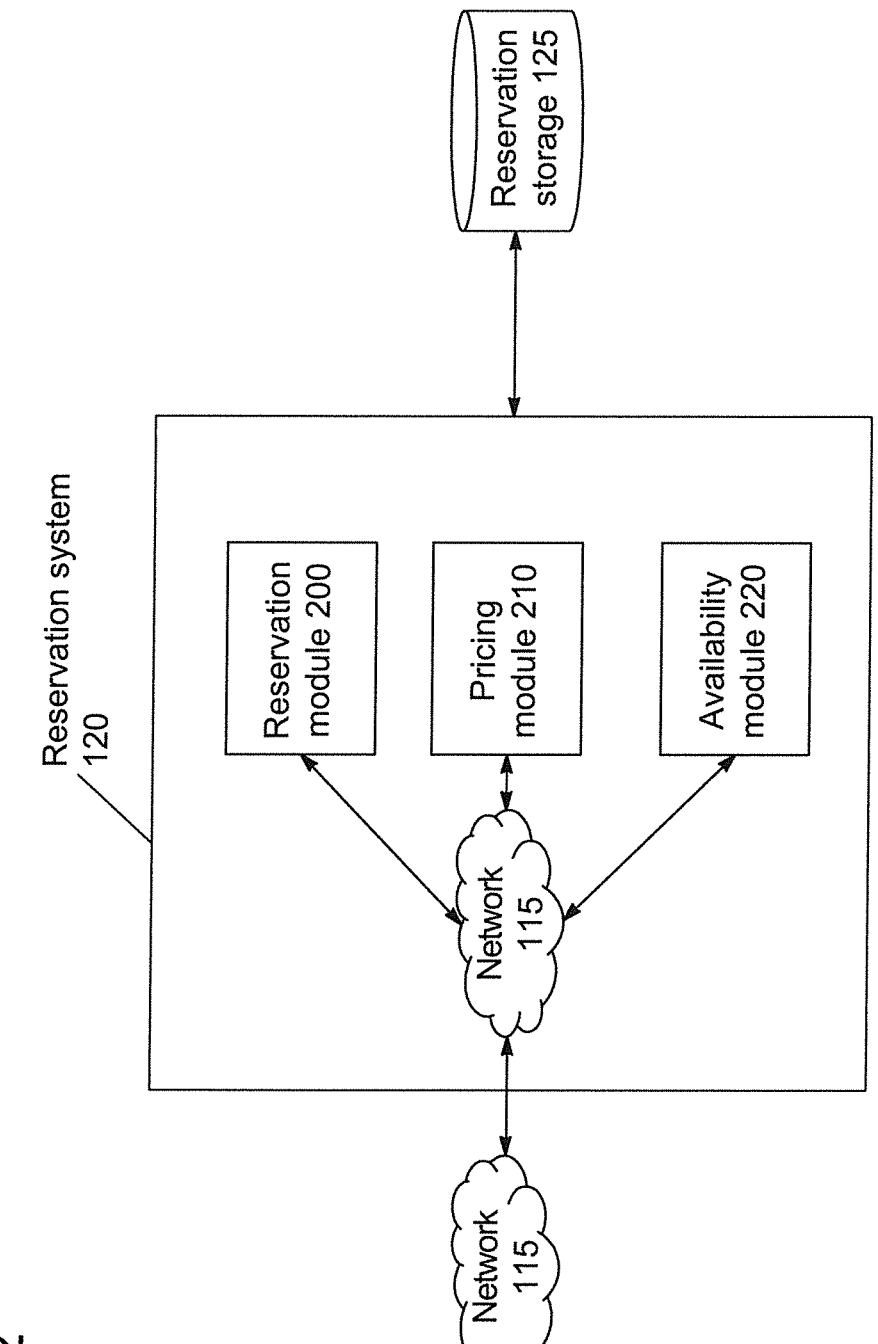
FIG. 2 is a diagrammatic view of the components of a reservation system 120 within a central reservation system 100.

Referring now to FIG. 2, a reservation system 120 within a central reservation system 100 includes a reservation module 200, a pricing module 210 and an availability module 220, and communicates with a reservation database 125. The availability module 220 queries the configuration database 130 and the reservation database 125. Based on the initial number of the travel products and the reservations that have been made, it computes the availabilities. The pricing module 210 is addressed when a user request is received. The available products satisfying the criteria given by the user are priced and listed.

Figure 3:
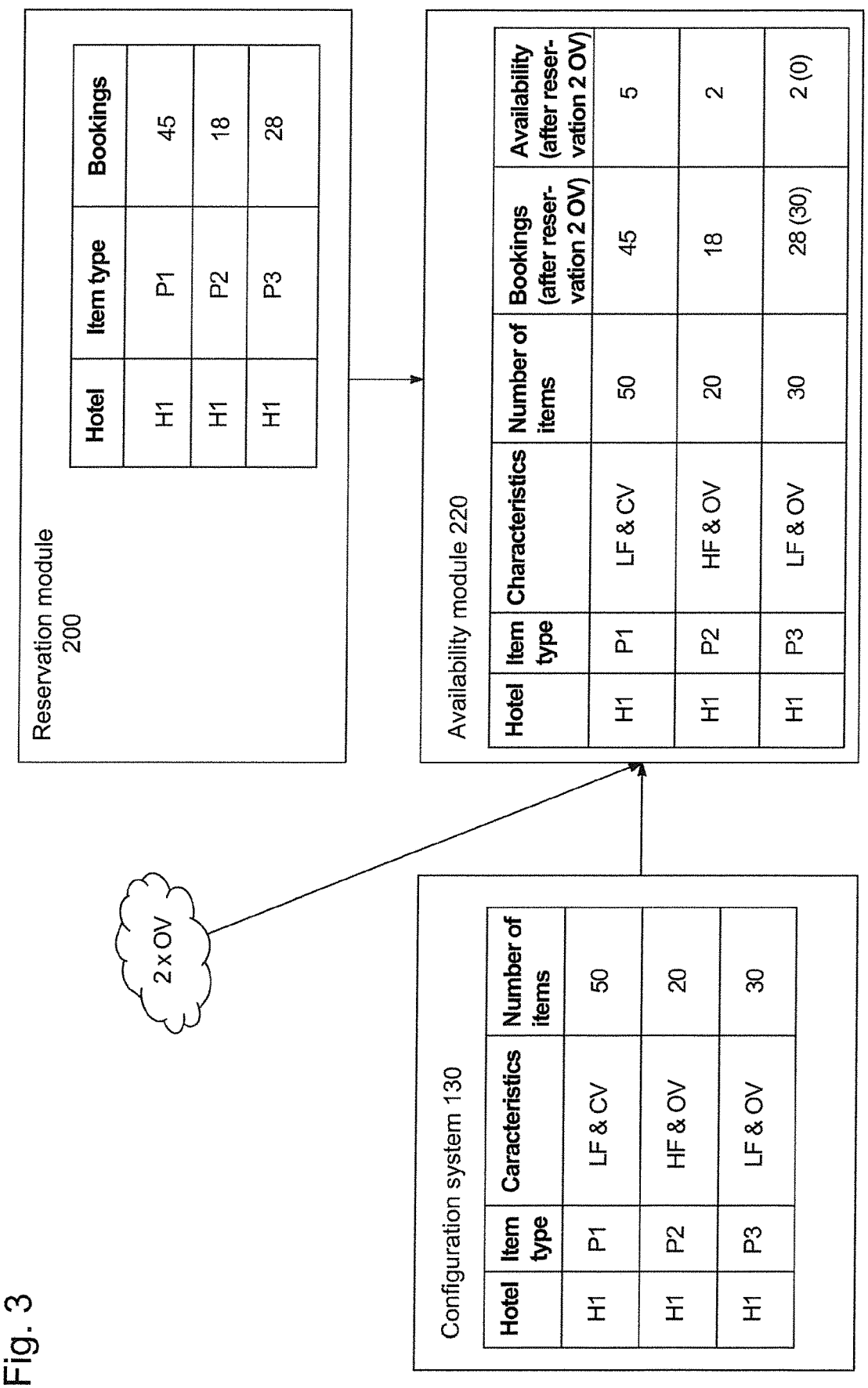
FIG. 3 is a diagrammatic view of an availability module 220, a reservation module 200 and a configuration system 130 within a conventional hotel reservation system.

In FIG. 3, the working of a reservation system 120 in a conventional hotel CRS 100 is illustrated for a hotel H1 on a given date. The configuration system 130 provides the list of the room types, the characteristics per room type and the daily number of rooms per room type to the availability module 220. The reservations that have been made are provided by the reservation module 200. With this input, the daily availabilities are computed. They are subsequently pushed to the availability cache system 140. Accepting a reservation for one item type for one room night implies increasing the number of reservations by one (an addition) and reducing the availability by one (a subtraction).

One may consider a hotel H1 corresponding to an inventory of 100 rooms spread over three different room types P1, P2 and P3. P1 corresponds to the characteristics low-floor and city-view (LF & CV). P2 corresponds to the characteristics high-floor and ocean-view (HF & OV). P3 corresponds to the characteristics low-floor and ocean-view (LF & OV). For a given date, P1 has an availability of 5, P2 has an availability of 2, and P3 has an availability of 2. When a reservation is accepted, a room type is allocated based on the criteria that the user has given. Suppose that a user searches two ocean-view rooms in a specific hotel and on a given date. In the availability cache system 140, several room types with the criterion ocean-view are available.

In a first scenario, the options are listed for the user:
a) 2×(LF & OV)
b) 2×(HF & OV)
c) 1×(LF & OV)+1×(HF & OV)

The user may choose two low-floor, ocean-view rooms (option a). This results in 2×room type P3 being allocated. Two reservations for P3 are stored in the reservation module 200. The availability of P3 will be affected and become 0. No more reservation requests for an ocean-view, low-floor room can be accepted anymore, even though this room type might be requested later on, for example by a user in a wheelchair. The staff would need to reaccommodate existing reservations to allocate these rooms to the person in the wheelchair, which might be complicated and the system would not be able to help.

In a second, more flexible scenario, the availability cache system 140 does not list the options for the user but instead notifies the user that two ocean-view rooms are available and gives the possibility to book. We can consider the request concerns two opaque products, where the only characteristic known is ocean view. Behind the scenes, however, one of the three options above will nevertheless be allocated to the reservation request. Suppose that two low-floor, ocean-view rooms are allocated. Two reservations for P3 are stored in the reservation module 200. The availability of P3 will be affected and become 0. In this scenario, the reservation can be reaccommodated if a reservation request for an ocean-view, low-floor room is received, but it may imply a cascading effect. In general, in a hotel with 100 rooms, if 99 unique requests (unique in terms of requested sets of characteristics) have been accepted, and each of the 99 reservations has to be reaccommodated to accept the $100^{th}$ reservation request, then the worst case number of permutations to be checked would be the factorial of 100 (100!), corresponding to $10^{157}$.

To summarize, by allocating a specific item type to the user at request time, an optimal use of the inventory is not guaranteed. The requested and guaranteed criteria may indeed form only a subset of the characteristics of the allocated item. Future requests containing all the characteristics of the allocated item may not be satisfied anymore, and the inventory will not be filled in an optimal way.

Figure 4:
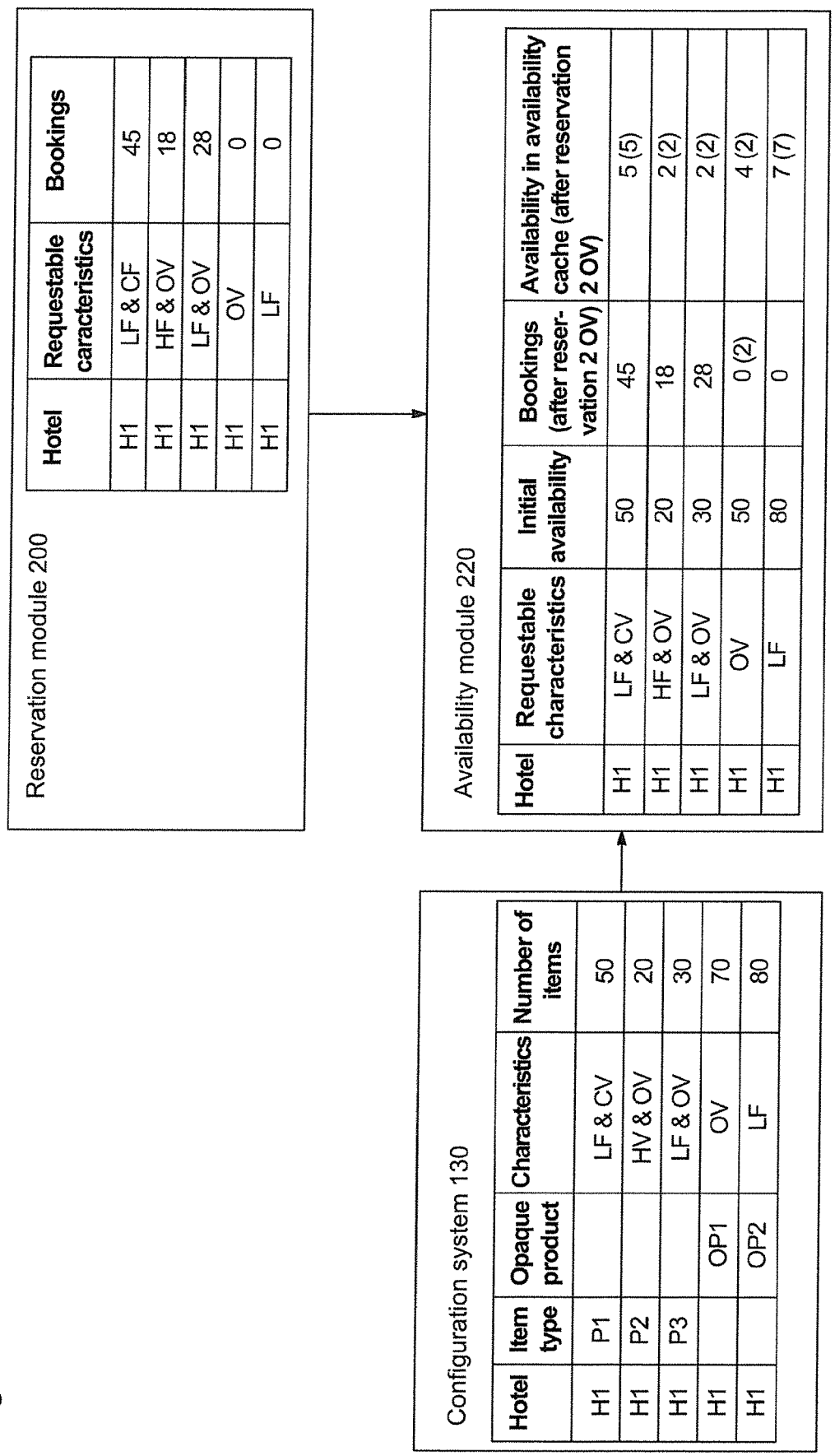
FIG. 4 is a diagrammatic view of an availability module 220, a reservation module 200 and a configuration system 130 within a hotel reservation system according to embodiments of the invention.

Referring now to FIG. 4, the working of a reservation system 120 in a hotel CRS 100 according to embodiments of the invention is illustrated. In a CRS 100 according to embodiments of the invention, reservations are not allocated to item types (as is the case in a conventional system), but to requestable sets of characteristics. Availabilities of item types are not computed as described hereinabove, but what are calculated are the availabilities of the sets of characteristics a user may request. Whereas checking whether a reservation can be accepted and computing availability values involve straightforward additions and subtractions in a conventional CRS 100 as illustrated in FIG. 3, it becomes complex in a CRS 100 according to embodiments of the invention and involves solving several maximum flow problems, as will be explained further below.

Consider an inventory of 100 rooms spread over three different room types (or item types) defined by the characteristics as illustrated on FIG. 4. In this example, the hotel management has defined that a user may request a room based on a precise room type (P1, P2 or P3), or either on the characteristic "ocean-view" (OV) or on the characteristic "low-floor" (LF). A requestable subset of characteristics such as OV or LF in this case, can be considered as an opaque product. Opaque product OP1 corresponds to OV; opaque product OP2 corresponds to LF. The availability module 220 requests the configuration data from the configuration system 130. Based on the item types and the requestable subsets of characteristics or opaque products as defined by the hotel management, the sets of characteristics that a user may request are defined, hereafter called requestable sets of characteristics. This results in five requestable sets of characteristics: LF & CV, HF & OV, LF & OV, OV, LF. For each requestable set of characteristics, the initial availability is computed. For a requestable set of characteristics that is a subset of an item type (an opaque product), the initial availability is the addition of the numbers of items per item type in which it is contained (the initial availability (OV)=number of items (LF & OV)+number of items (HF & OV). Consider that some reservations have been registered in the reservation module 200 for the requestable sets of characteristics LF & CV, HF & OV, LF & OV as illustrated on FIG. 4. The skilled person will understand that reservations made with the conventional system may be imported in a system according to embodiments of the invention as part of the set-up. In this case, the reservations, originally stored for item types, are converted into reservations for sets of requestable characteristics. A user looking for two ocean-view rooms may access the Graphical User Interface (GUI) of a CRS 100 for hotels through a client system 105 such as an online travel agency. The user may enter his criterion "ocean-view" (OV) in a text box on the GUI or tick a corresponding box and specify that he wants two rooms of this type for a given set of dates (reservation request of party size two). In this example, it is assumed that the request is made for a single date. The request is sent to the back-end systems of the hotel CRS 100. The availability cache system 140 checks the availability and finds four available rooms. The availability values in the availability cache system 140 have been calculated after the last accepted reservation was processed. How this is done will be explained further below. The user gets the possibility to book. The reservation request is sent to the reservation module 200. Upon reception of the reservation request, the availability of the requested set of characteristics is computed for each date specified in the reservation request, i.e. one single date in this example, taking into account, on the one hand, the initial availability of all the requestable sets of characteristics and, on the other hand, the reservations that have been accepted (as stored in the reservation database 125). This can be done by solving two maximum flow problems as explained further below. Supposing that no reservations have been accepted meanwhile, the availability values will be as illustrated on FIG. 4. The availability of the requestable characteristic OV is four, so the reservation request for two ocean-view rooms can be accepted. The reservation module 200 stores two reservations for the requestable characteristic OV in the reservation database 125. All the availability values are recomputed as explained further below and the availability cache system 140 is refreshed.

Contrary to the solution described previously, a specific room type (and by extension a specific room) is not allocated to the reservations. The reservation system 120 knows that two rooms corresponding to the requested set of characteristics are available, but the reservations are only assigned to a specific room type (and room) at the check-in. This implies more room types remain available. As illustrated on FIG. 4, after two reservations for OV, only the availability of OV is affected. The availabilities of the requestable sets of characteristics (HF & OV) and (LF & OV) remain unchanged, and, as opposed to the example above, a user request for an ocean-view, low-floor room can still be accepted.

Figure 5:
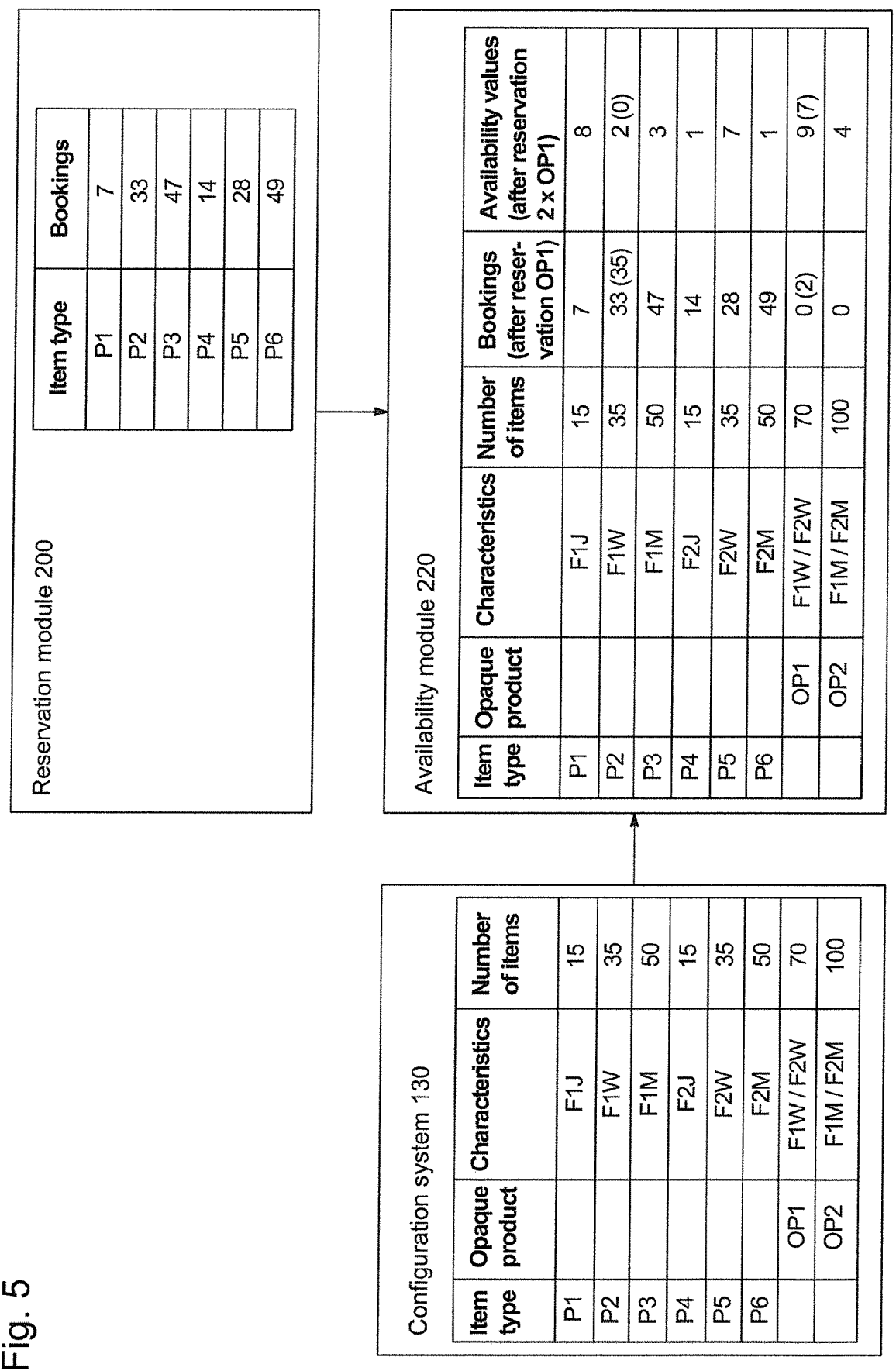
FIG. 5 is a diagrammatic view of an availability module 220, a reservation module 200 and a configuration system 130 within a conventional flight reservation system.

In FIG. 5, the working of a reservation system 120 in a conventional flight CRS 100 is illustrated. Consider two different flights F1 and F2, with the same origin and destination, for example Nice-Madrid (NCE-MAD), but a different timing. The departure time of F1 is 7 am; the departure time of F2 is 4 pm. Both flights have several cabin codes. A cabin code corresponds to a number of seats and a margin of overbooking. Examples of cabin codes are First class, Business, Premier Economy, Economy. F1 and F2 both have 100 seats spread over three different cabin codes Business (J), Premier Economy (W), Economy (M) at the beginning of the reservation period. Consider a configuration with eight air products. Six out of the eight can be considered as standard products: the flight number and cabin class are known. Two out of the eight are opaque products: the origin, destination and cabin code are known, but the flight number (and hence the time of departure) is hidden. Eight air products are available:

- opaque product OP1 that can be routed either on flight F1 cabin code Premier Economy W (F1W) or on flight F2 cabin code Premier Economy W (F2W) (F1W|F2W)
- opaque product OP2 that can be routed either on flight F1 cabin code Economy M (F1M) or on flight F2 cabin code Economy M (F2M) (F1M|F2M)
- standard product P1 corresponding to flight F1 and cabin code Business J (F1J)
- standard product P2 corresponding to flight F1 and cabin code Premier Economy W (F1W)
- standard product P3 corresponding to flight F1 and cabin code Economy M (F1M)
- standard product P4 corresponding to flight F2 and cabin code Business J (F2J)
- standard product P5 corresponding to flight F2 and cabin code Premier Economy W (F2W)
- standard product P6 corresponding to flight F2 and cabin code Economy M (F2M)

The reservation module 200 stores the number of reservations per item type. To calculate the availabilities, the availability module 220 takes into account the configuration data stored in the configuration database 135 and the reservation data stored in the reservation database 125. The availability of an opaque product is equal to the sum of the availabilities of the item types to which the opaque product may correspond. Taking OP1 for example, which may correspond to F1W or to F2W (F1W|F2W), its availability is equal to the availability of F1W plus the availability of F2W (2+7=9). Suppose that a user wants to book two seats on flight Nice-Madrid on a given date in cabin code Premier Economy (reservation request of party size 2), but that the user is flexible on departure time. The user enters his request on the GUI of a flight CRS 100 and gets to choose between products P2, P5 and OP1. OP1 may be cheaper than P2 or P5 and the user may choose OP1. OP1 can either correspond to F1 cabin code W (F1W) or F2 cabin code W (F2W). When the reservation is accepted, it will be allocated to either F1W or F2W. Suppose the request of party size 2 for the opaque product OP1 is allocated to F1W. The availability of P2 (F1W) becomes zero. This means no more reservation requests can be accepted for F1W.

Figure 6:
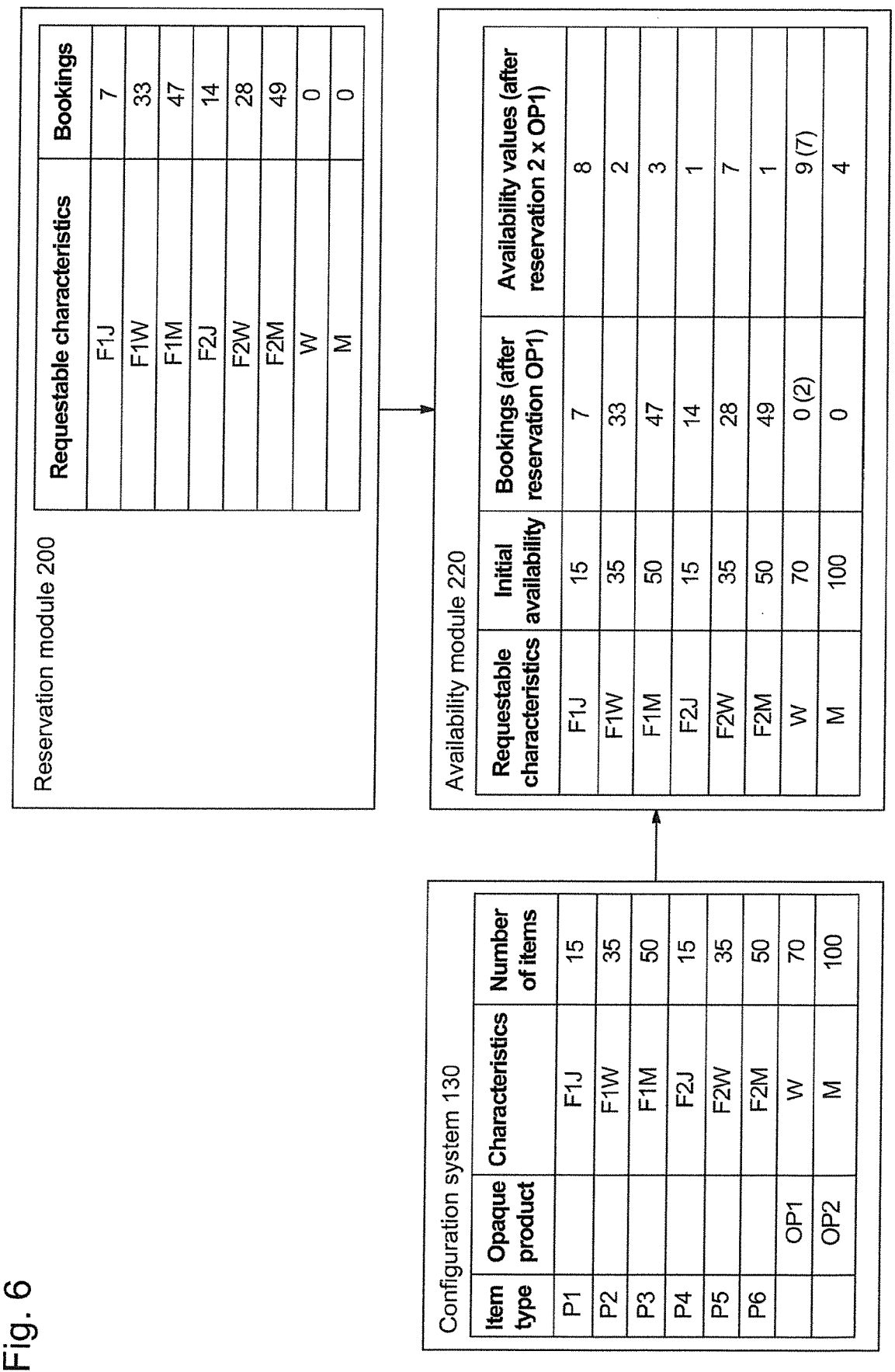
FIG. 6 is a diagrammatic view of an availability module 220, a reservation module 200 and a configuration system 130 within a flight reservation system according to embodiments of the invention.

Referring now to FIG. 6, the working of a reservation system 120 in a flight CRS 100 according to embodiments of the invention is illustrated. Consider the same configuration data as in the previous example. A number of reservations has been accepted. The skilled person will understand that reservations made with the conventional system may be imported in a system according to embodiments of the invention as part of the set-up. In this case, the reservations, originally stored for item types, are converted into reservations for sets of requestable characteristics. As illustrated, in a system according to embodiments of the invention, in the reservation module 200 and availability module 220, item types and opaque products are considered in terms of their requestable characteristics. The standard products correspond to a flight number and cabin code; opaque product OP1 corresponds to requestable characteristic W; opaque product OP2 corresponds to requestable characteristic M.

A user looking for two flights NCE-MAD in Premier Economy on a certain date may access the Graphical User Interface (GUI) of a flight CRS 100 through a client system 105 such as an online travel agency. The user may input his criteria on the GUI. The request is sent to the back-end systems of the flight CRS 100. The availability cache system 140 finds three requestable sets of characteristics that fit the user request:
1. F1W, availability=2
2. F2W, availability=7
3. W, availability=9.

These availability values were calculated after the last accepted reservation was processed. How this is done will be further explained below.

Option 3, corresponding to opaque product OP1, may be the cheapest option. The user may be flexible on his departure time and book option 3. The reservation request is sent to the reservation module 200. Upon reception of the reservation request, the availability of the requested set of characteristics is computed taking into account, on the one hand, the initial availability of all the requestable sets of characteristics and, on the other hand, the reservations that have been received (as stored in the reservation database 125). This can be done by solving two maximum flow problems as explained further below. Supposing that no reservations have been taken meanwhile, the availability values will be as illustrated on FIG. 6. The availability of the requestable characteristic W is 9, so the reservation request for 2×W (corresponding to opaque product OP1) can be accepted. The reservation module 200 stores two reservations for the requestable characteristic W in the reservation database 125. All the availability values are recomputed as explained further below and the availability cache system 140 is refreshed.

The availability of W will be reduced by 2, but the availabilities of F1W and of F2W remain unchanged as the reservation has not been assigned to one specific air item type. Whereas a subsequent reservation request for F1W could not be accepted in a conventional CRS 100 as explained in the previous example, a reservation request for F1W can still be accepted in a CRS 100 according to embodiments of the invention.

Figure 7:
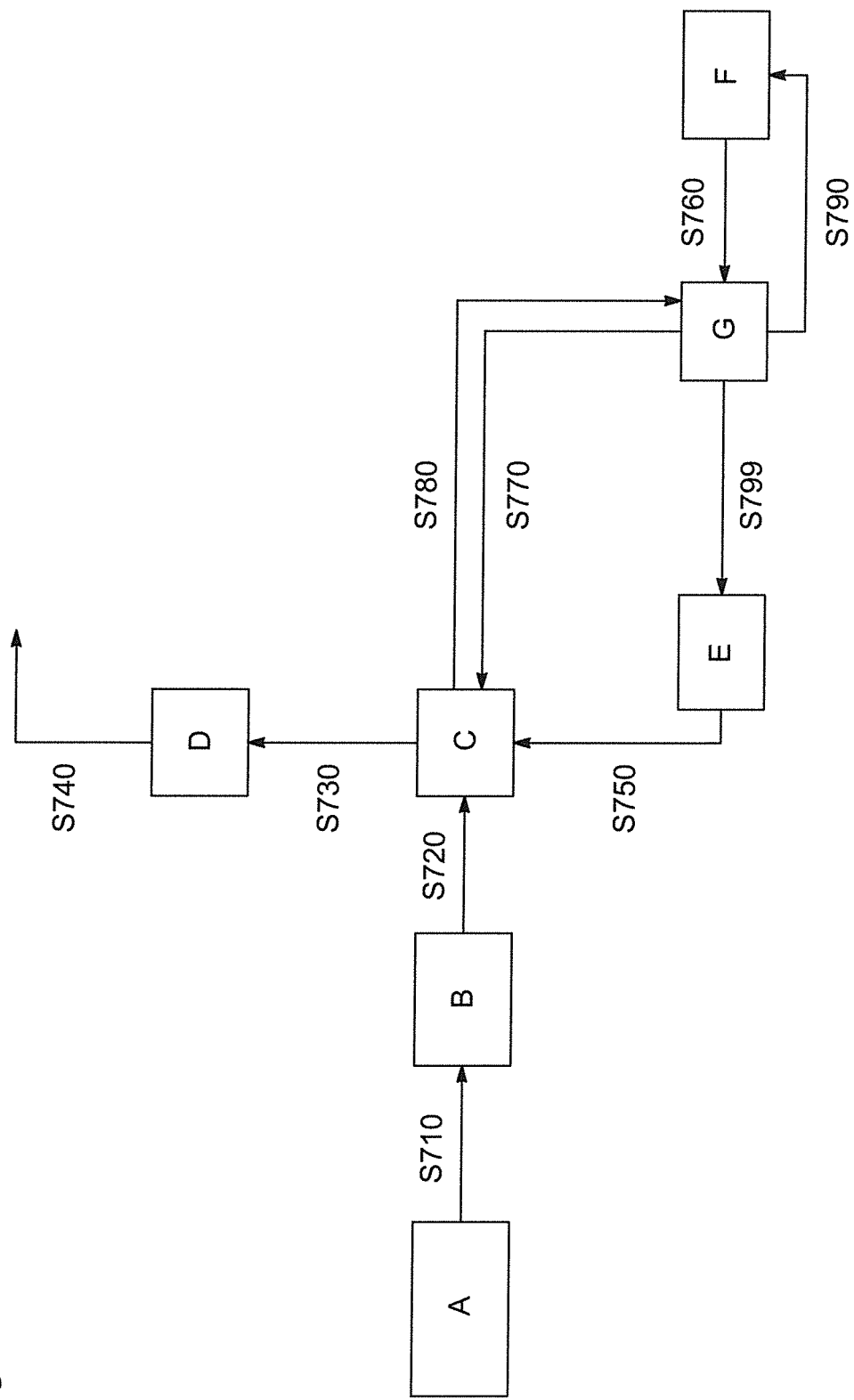
FIG. 7 is a flow diagram illustrating the virtualization method as disclosed by embodiments of the invention.

Referring now to FIG. 7, the virtualization method as disclosed by embodiments of the invention is described in more detail. A further advantage of this set-up is that, counter-intuitively, the number of computations to be done to determine if a reservation can be accepted decreases when the number of accepted reservations increases, as opposed to the system disclosed in the patent application Ser. No. 09/747,815 "Airline reservation system that supports guaranteed reservations for a preferred category of seating" by Boies et al. By representing an inventory of items in terms of requestable characteristics, the inventors found that the availability problem can be represented as a variation of a maximum flow problem (https://en.wikipedia.org/wiki/Maximum_flow_problem). The requestable sets of characteristics, the item types and the number of items for each item type are visualized on a graph, and availability computations can be done by solving several maximum flow problems. The inventors found that computing the availability of a set of characteristics c and putting the graph back in a state equivalent to its state before the computation of the availability of c (thus allowing the computation of the availability of another set of characteristics) can be done by applying a variation of a maximum flow algorithm such as "Maximum Flow Through a Network" by L. R. Ford, Jr and D. R. Fulkerson (Canadian Journal of Mathematics, vol. 8, pages 399-404, 1956). The examples further below illustrate this. The inventors call the algorithm used in this embodiment "iterative bounded maximum flow".

Figure 13:
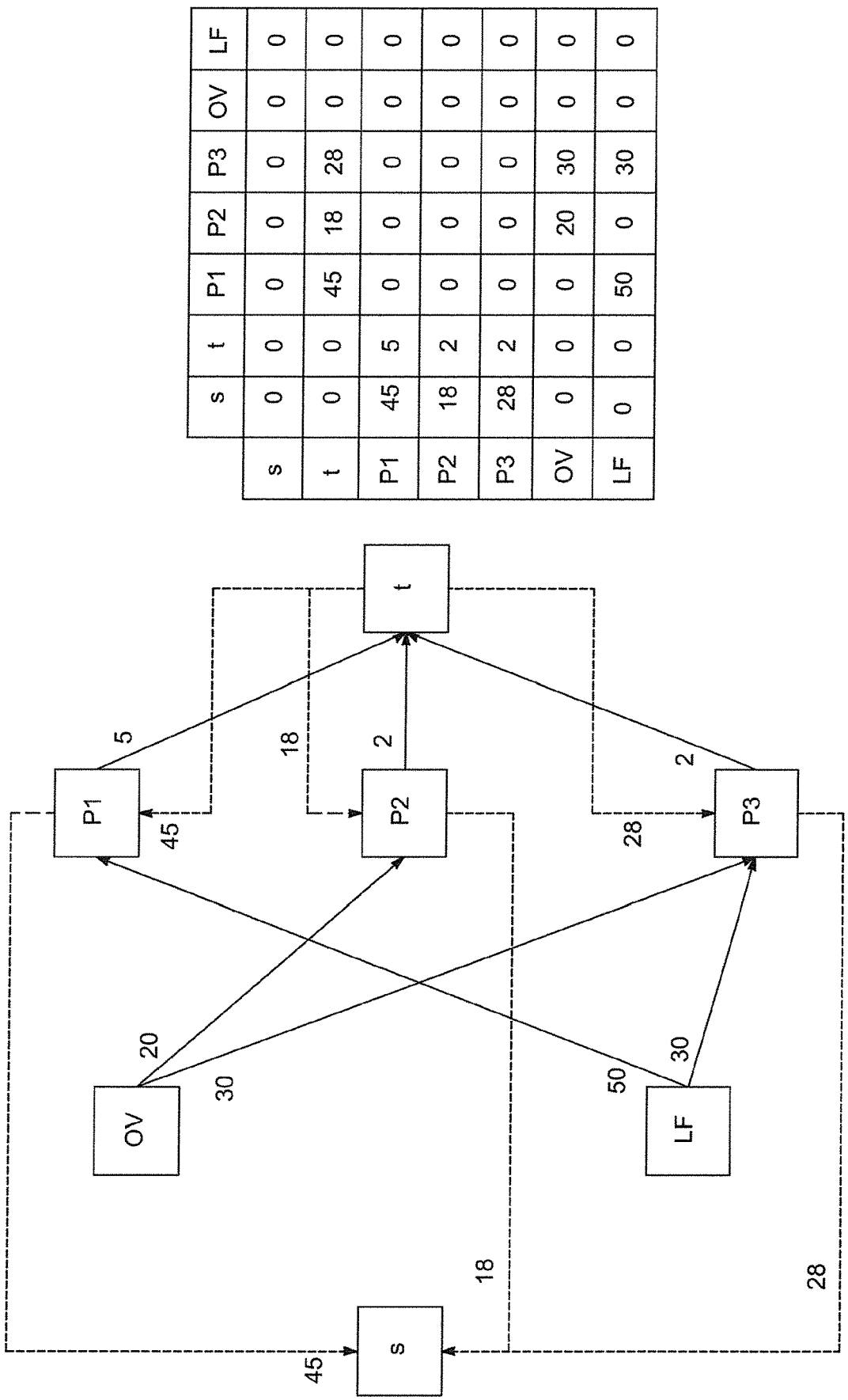
FIG. 13 shows the exemplary graph of FIG. 11 and the corresponding capacity matrix after executing a maximum flow algorithm from node s to node t and storing the reverse flow in the capacity matrix. The graph is now in a state that, taking into account initial availabilities and accepted reservations, allows the computation of the availability of a requestable set of characteristics.
Figure 14:
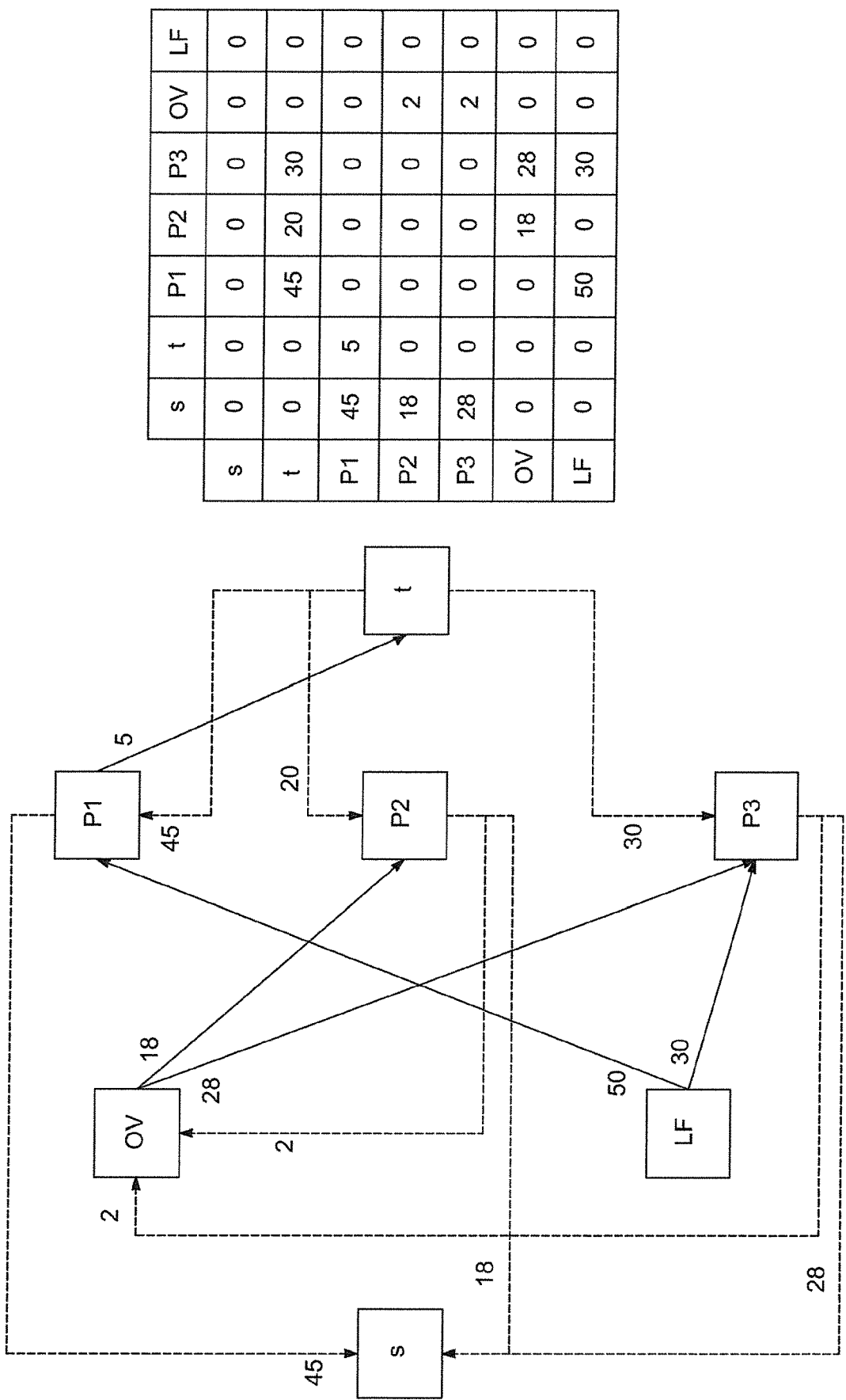
FIG. 14 shows the exemplary graph of FIG. 13 and the corresponding capacity matrix after executing an iterative maximum flow algorithm between node OV and node t to compute the availability of the requestable subset of characteristics OV, and storing the reverse flow in the capacity matrix.
Figure 15:
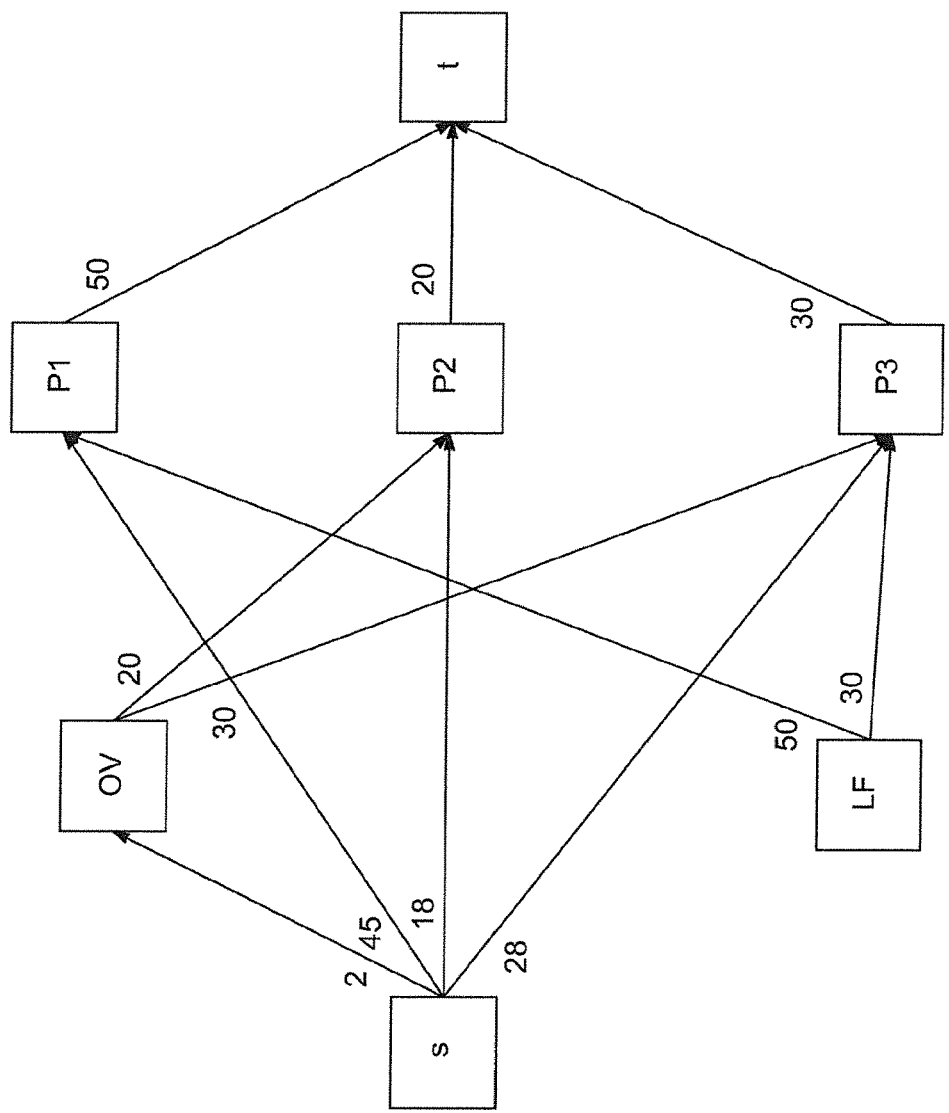
FIG. 15 shows the exemplary graph of FIG. 11 and the corresponding capacity matrix when a reservation for two ocean-view rooms is accepted.
Figure 16:
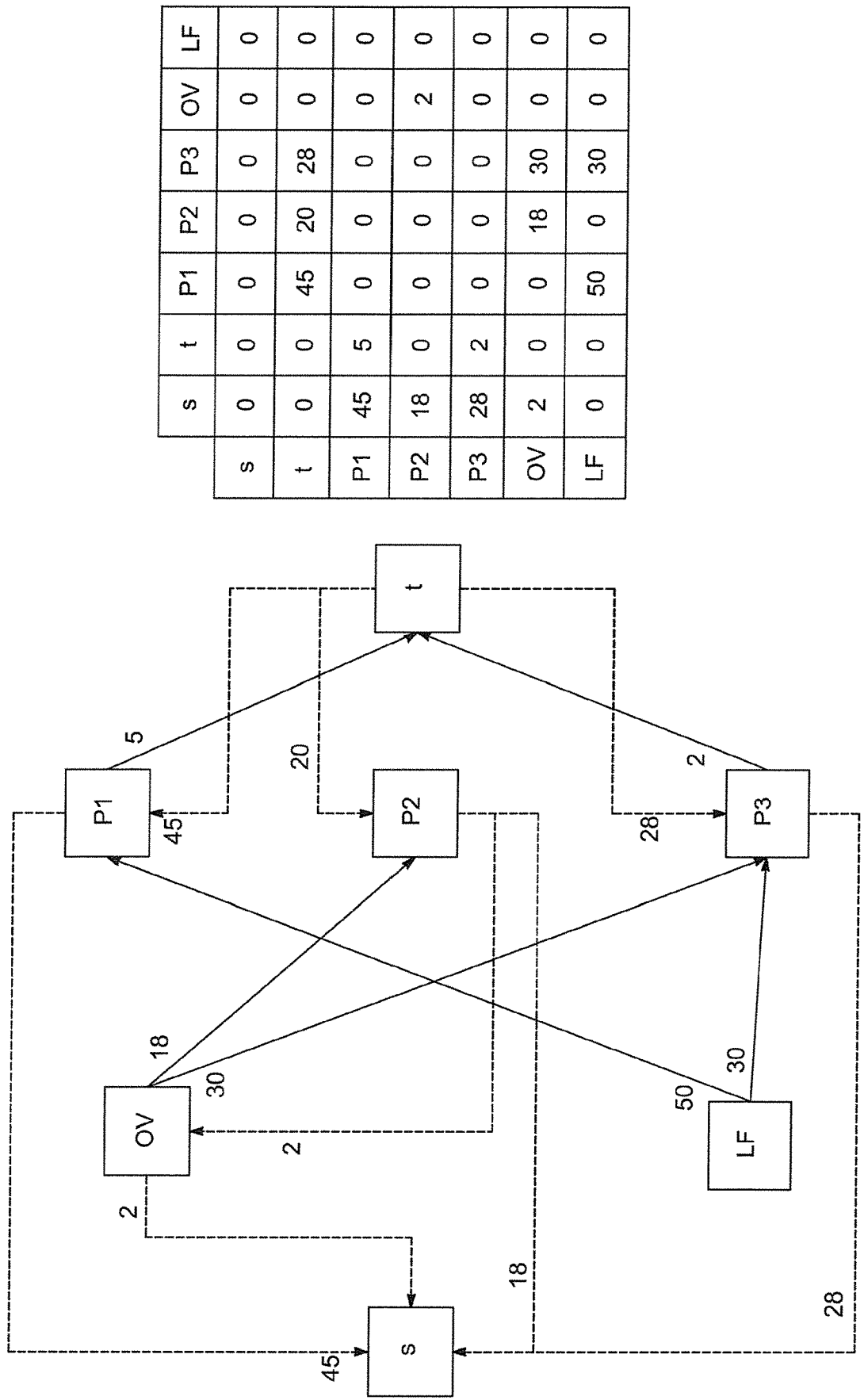
FIG. 16 shows the exemplary graph of FIG. 15 and the corresponding capacity matrix after running a maximum flow algorithm from node s to node t and storing the reverse flow in the capacity matrix. The graph is now in a state that, taking into account initial availabilities and accepted reservations including the new reservation for two ocean-view rooms, allows the computation of the availability of a requestable set of characteristics.
Figure 17:
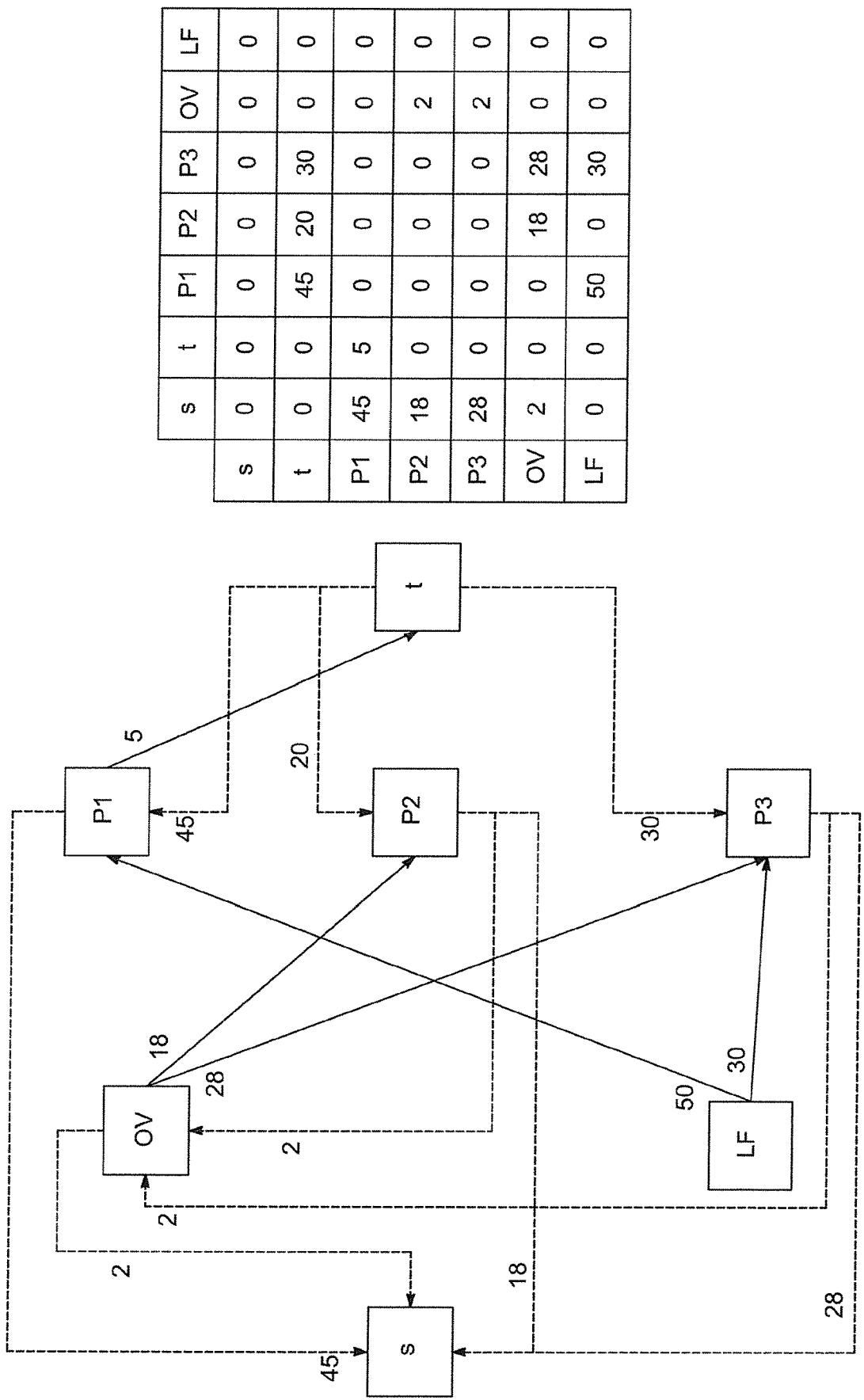
FIG. 17 shows the exemplary graph of FIG. 16 and the corresponding capacity matrix after running an iterative maximum flow algorithm from node OV to node t to compute the availability of the requestable subset of characteristics OV and storing the reverse flow in the capacity matrix.
Figure 18:
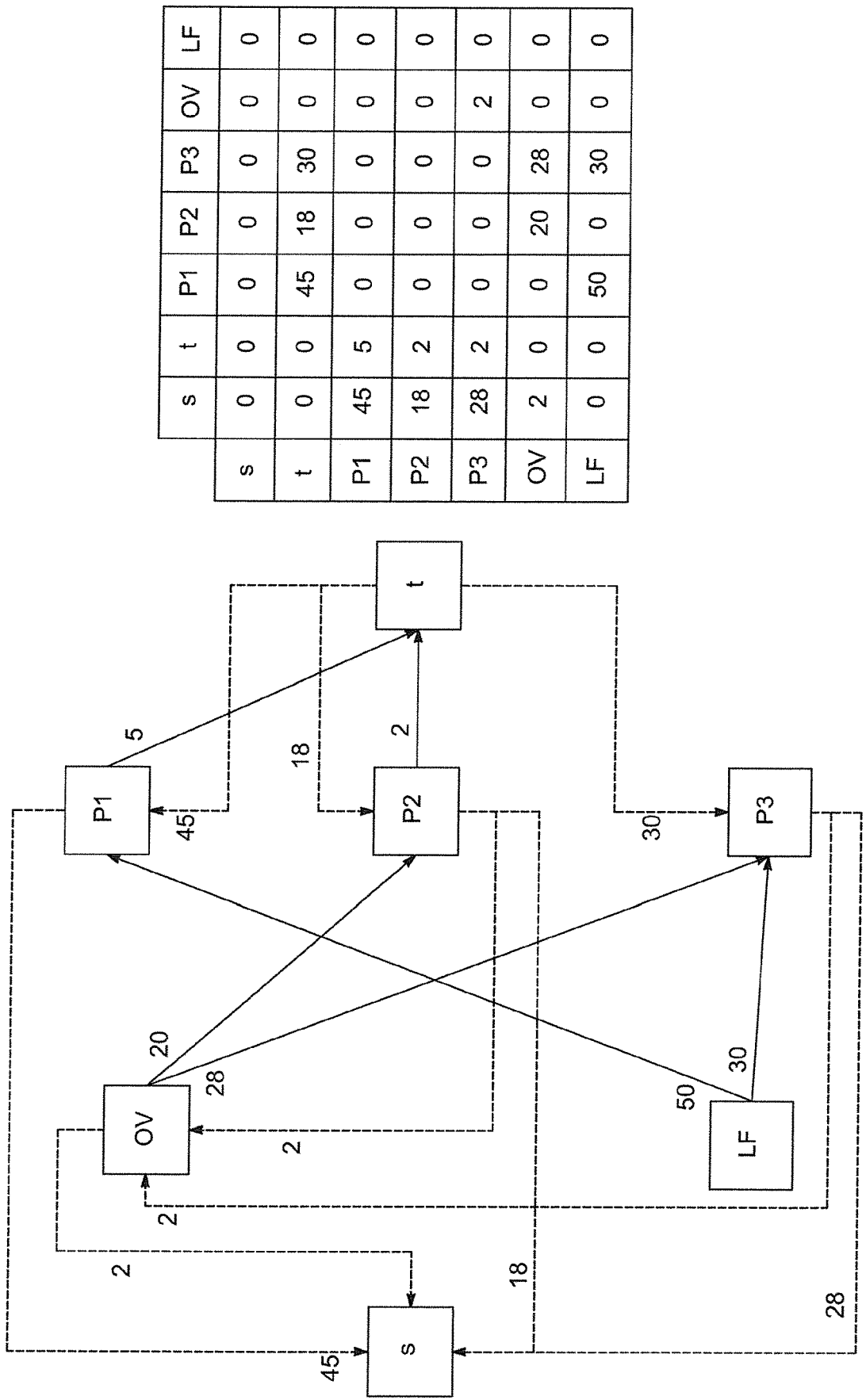
FIG. 18 shows the exemplary graph of FIG. 17 and the corresponding capacity matrix after it has been reverted to an equivalent state to that before the availability computation of OV.

The configuration data A is read from the configuration database 135, and converted into a list of item types, the set of characteristics corresponding to an item type and the number of items per item type. Apart from "standard" item types such as, for hotel, a room type in a given hotel on a given night or, for air, a flight number combined with a cabin code on a given date, this list may also comprise opaque products or requestable subsets of characteristics (RSC), which correspond to various "standard" item types as illustrated in the previous figures. In step S710 the configuration data A is converted into an enumeration of requestable sets of characteristics and their number or initial availability (B). For an opaque product or RSC, its number (B) is equal to the sum of the numbers of the corresponding item types. With input data B, a graph C is constructed and initialized (S720) as explained below with reference to FIG. 8. The availabilities are computed (S730). At this stage, when no reservations have been accepted yet, the availabilities of the requestable sets of characteristics D correspond to the initial availabilities and are computed from the configuration data A. The availabilities D are sent to the availability cache system (S740). A user request F may be received. When a user sends a request for a travel product via the GUI of a CRS 100, it is translated into a set of characteristics G (S760). To check if user request F (corresponding to set of characteristics G) can be fulfilled, the set of characteristics G is sent to the availability module 220 (S770). A graph C is constructed and initialized (S720), as illustrated in FIG. 9 (hotel) and FIG. 19a (air). The availability module 220 subsequently requests the existing reservations from the reservation module 200. The graph C is updated with the existing reservations E, as explained below with reference to the flow diagram on FIG. 10 and as illustrated in FIG. 11 (hotel) and FIG. 20a (air), and the maximum flow is run and the reverse flow is added on the graph (in dashed lines) as illustrated in FIG. 13 and FIG. 16 (hotel), and FIG. 21a and FIG. 24a (air) (S750). The availability of the set of characteristics G can now be computed (S780) by running an "iterative maximum flow" algorithm, as illustrated in FIG. 14 and FIG. 17 (hotel), and FIG. 22a and FIG. 25a (air). If the set of characteristics G is not available, the reservation request is declined (S790). If the set of characteristics G is available, the user request F can be accepted. G is added to the list of accepted reservations E in the reservation database 125 (S799) and the user is notified that the reservation has been made (S9). Graph C is (re)computed taking into account the configuration data A (S720) and updated with the accepted reservations E as illustrated in FIG. 15 (hotel) and FIG. 23a (air), and the maximum flow algorithm is run and the reverse flow is stored as illustrated in FIG. 13 and FIG. 16 (hotel), and FIG. 21a and FIG. 24a (air) (S750). The availabilities of the requestable sets of characteristics D are recomputed (S3) by iterating an iterative maximum flow algorithm (S730). The flow is reverted to allow the computation of the availability of another requestable of characteristics, as illustrated in FIG. 18 (hotel) and FIG. 26a (air). The availabilities of the requestable sets of characteristics are sent to the availability cache system 140 (S750).

Figure 8:
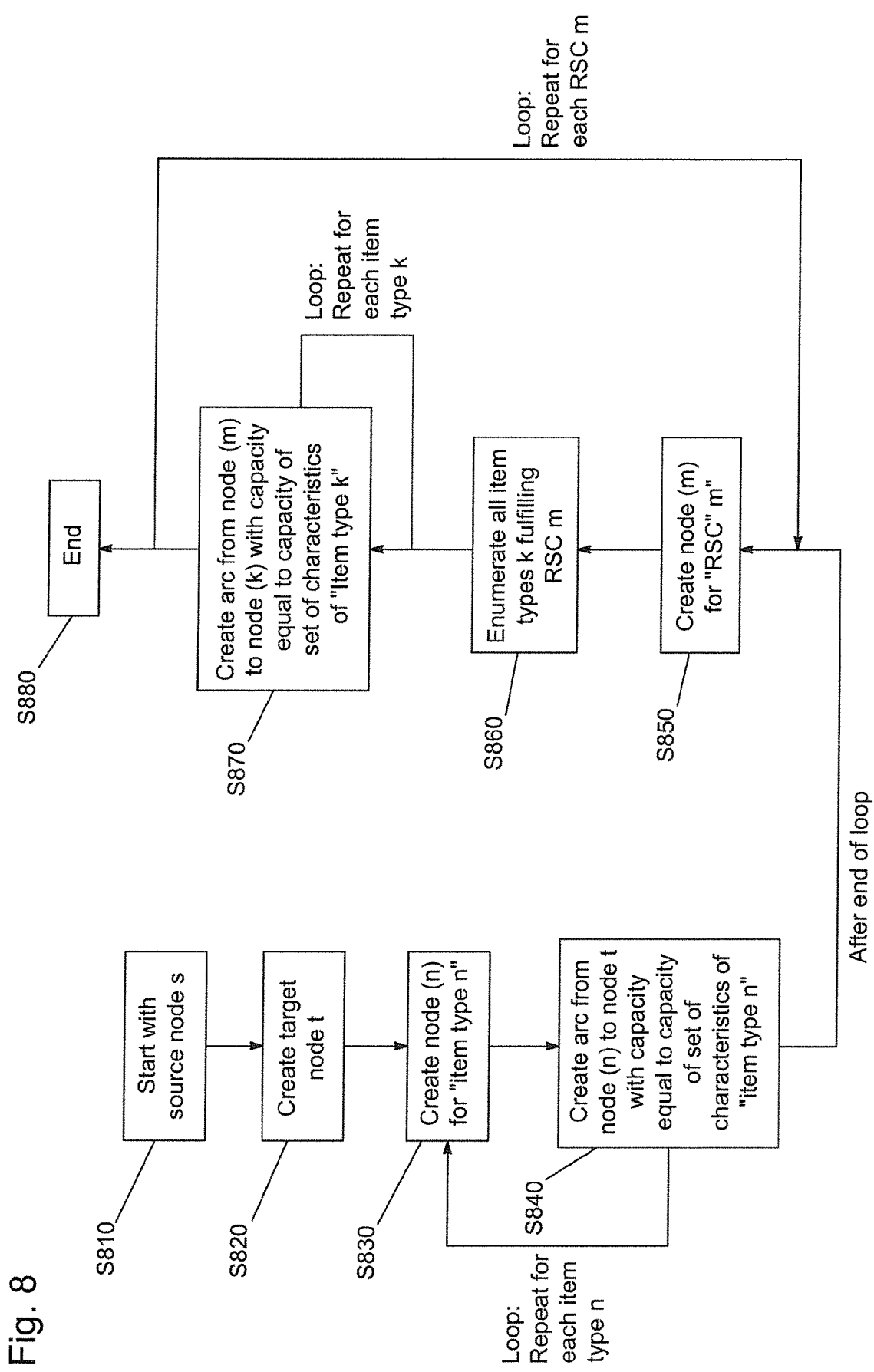
FIG. 8 is a flow diagram illustrating the steps to construct a graph.
Figure 9:
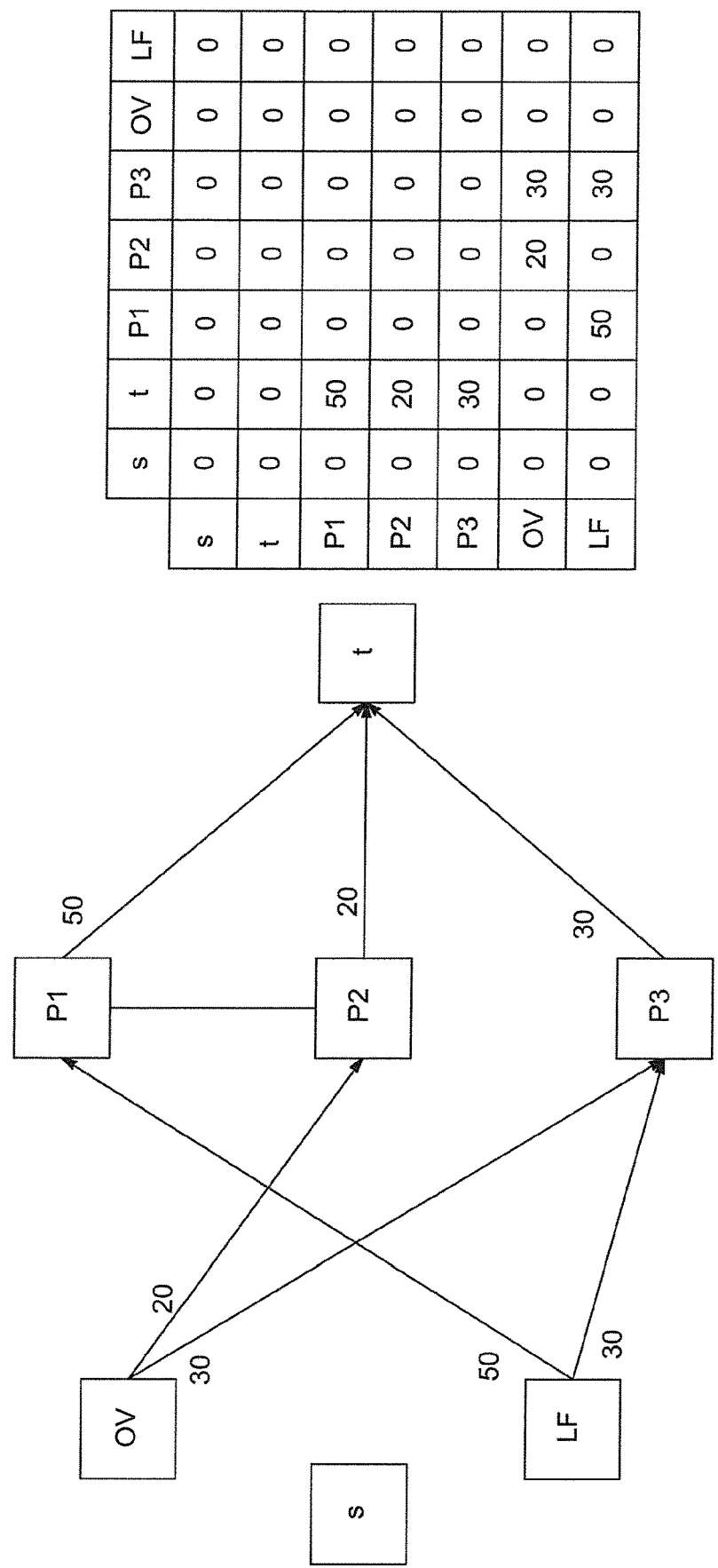
FIG. 9 shows an exemplary initialized graph and the corresponding capacity matrix in memory.

FIG. 8 illustrates how a graph may be constructed and initialized with configuration data. A graph is composed of nodes and directed arcs representing a capacity. An arc is going from a node to another node with a given capacity. An item type is a set of characteristics and an associated number, i.e. capacity. They are enumerated 1, 2, 3 ..., n. An RSC (also called an opaque product) is a unique requestable subset of characteristics that is not itself an item type. They are enumerated 1, 2, 3 ..., m. A requestable set of characteristics is either an item type or a RSC. To initialize the graph, the following input is needed:

All the item types with their associated numbers, i.e. capacities. In a hotel reservation system, an item type may be a room type in a given hotel and on a given date; in a flight reservation system, an item type may be the combination of a flight number, a leg (characterized by an origin and a destination) and a cabin code on a given date.

All the requestable subsets of characteristics (RSC) or opaque products.

A graph of size N is constructed with N=2+number of unique item types+number of requestable subsets. The graph is composed of nodes: source, target, one node per unique item type, one node per requestable subset of characteristics (RSC), each of these being assigned a unique number between 0 and N−1.

First, source node s is created (S810). Target node t is then created (S820). Subsequently, for each item type (n):

A node (n) corresponding to "item type n" is created (S830)

An arc is created from node (n) to node t, with a capacity equal to the capacity of the set of characteristics of item type n (S840).

Subsequently, nodes and arcs are created for every requestable subset of characteristics (RSC) m. This is done as follows. For each RSC m:

A node (m) corresponding to RSC m is created (S850)

All the item types k containing the RSC m are enumerated (S860)

For each item type k, an arc is created from node (m) to node (k) with a capacity equal to the capacity of the set of characteristics of item type k (S870).

The construction and initialization of the graph are now finished (S880).

The date time interval may be considered as a characteristic. If the availability module 220 works independently per date time interval, the maximum flow algorithm is applied independently on each interval; if the date time interval is modeled as a characteristic, the maximum flow algorithm is applied only once on all data.

The graph may be optimized in number of arcs by having RSCs connect to corresponding RSCs instead of or as well as connecting to item types. The capacity may be set on the nodes instead of on the arcs, or on both.

The person skilled in the art will understand that the graph may be constructed in different ways to model an equivalent problem. The graph may for example have several sources and targets, and nodes and arcs may be created in another way.

In memory, the graph may be stored as a capacity matrix (int[N][N]) wherein each cell includes the capacity. Creating a node means adding its column and row to the matrix. The matrix cells contain 0 by default. Creating an arc from node a to node b with capacity c means setting matrix[a][b]=c. The initialization of the graph results in the following capacity matrix. When for each item type n, the capacity of the arc "item type n to target t" is set to the capacity of this item type n as defined in the configuration system 130, the value (capacity_matrix[n][TARGET]) is correspondingly set to the capacity of item type n as defined in the configuration system 130. When for each requestable subset of characteristics m, for each possible corresponding item type n, the capacity of the arc "m to n" is set to the capacity of n as defined in the configuration system 130, the value (capacity_matrix[m][n]) is correspondingly set to the capacity of n as defined in the configuration system 130. The person skilled in the art may understand that other representations of the graph in memory are possible.

In FIG. 9, a graph of size 7 is constructed with 7=2+3 (number of unique item types)+2 (number of requestable subsets), as explained in the steps on FIG. 8.

The graph and corresponding capacity matrix in memory shown on FIG. 9 are constructed and initialized with the configuration data as illustrated on FIG. 4.

Configuration Data:

| Hotel | Item type | Opaque product | Characteristics | Number of items |
|---|---|---|---|---|
| H1 | P1 | | LF & CV | 50 |
| H1 | P2 | | HF & OV | 20 |
| H1 | P3 | | LF & OV | 30 |
| H1 | | OP1 | OV | 70 |
| H1 | | OP2 | LF | 80 |

First the source and the target are created. Then, for each item type (P1, P2, P3) a node is created. An arc is created from each item type to the target with a capacity as defined in the configuration system 130 (P1-t: 50, P2-t: 20, P3-t: 30). Subsequently, a node is created for each requestable subset of characteristics or opaque product (OV, LF). From each requestable subset of characteristics, an arc is created to the corresponding item types (OV-P2, OV-P3; LF-P1, LF-P3). The capacity of the requestable set of characteristics is equal to the capacity of the item types as defined in the configuration system 130 (OV-P2: 20, OV-P3: 30; LF-P1: 50, LF-P3: 30). The graph corresponds to a capacity matrix (int[7][7]). When for each item type n, the capacity of the arc between node (n) and target node t is set to the capacity of this item type n as defined in the configuration system 130 (P1-t: 50, P2-t: 20, P3-t: 30), the value (capacity_matrix[n][t]) is correspondingly set:

Capacity matrix [P1][t]=50
Capacity matrix [P2][t]=20
Capacity matrix [P3][t]=30

When for each requestable subset of characteristics m, for each possible corresponding item type n, the capacity of the arc between node (m) and node (n) is set to the capacity of n as defined in the configuration system 130 (OV-P2: 20, OV-P3: 30, LF-P1: 50, LF-P3: 30), the value (capacity_matrix[m][n]) is correspondingly set:

Capacity matrix [OV][P2]=20
Capacity matrix [OV][P3]=30
Capacity matrix [LF][P1]=50
Capacity matrix [LF] [P3]=30

Figure 10:
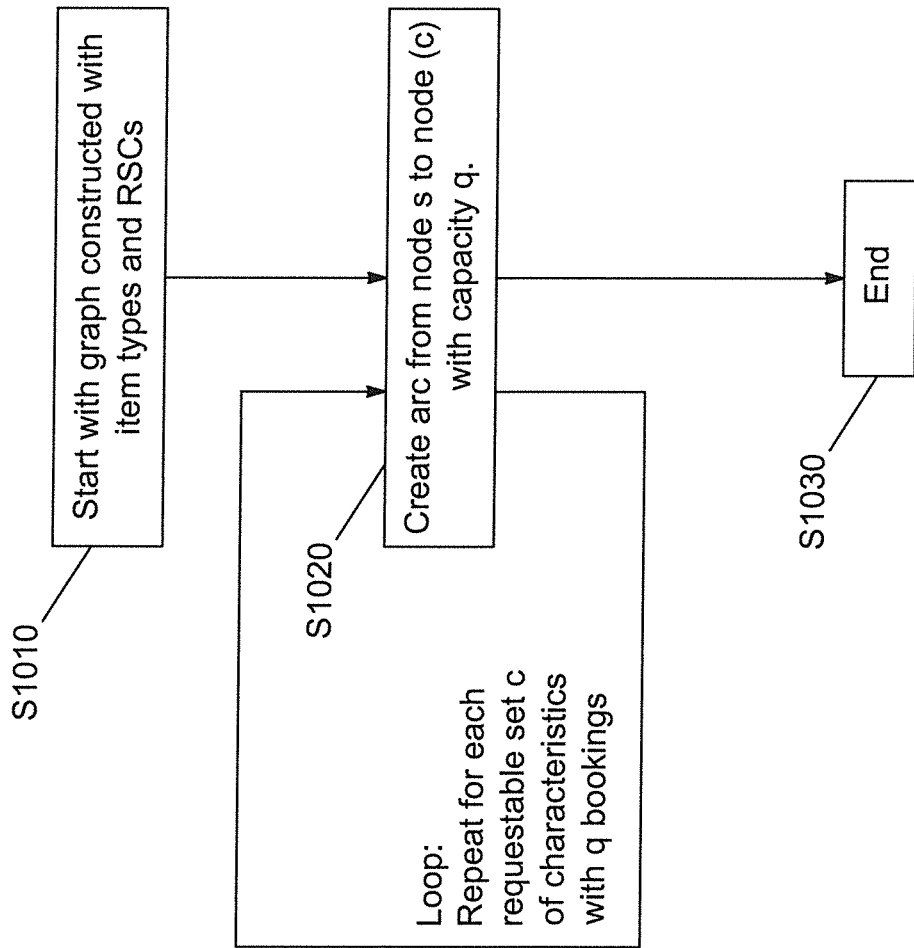
FIG. 10 is a flow diagram illustrating the steps to update a graph with accepted reservations.
Figure 11:
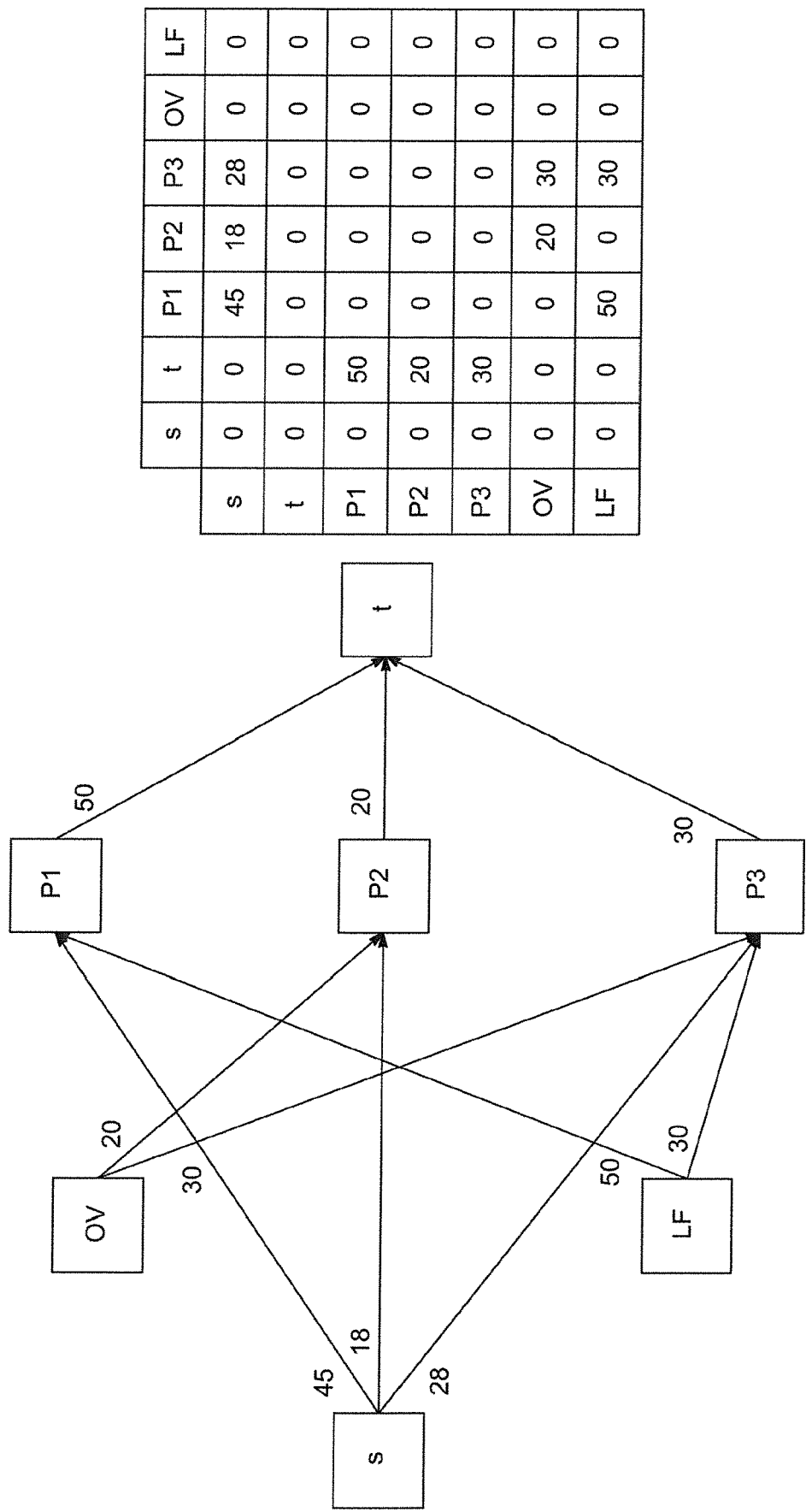
FIG. 11 shows the exemplary graph of FIG. 9 updated with accepted reservations and the corresponding capacity matrix in memory.

FIG. 10 illustrates the steps undertaken to update a graph with accepted reservations.

One starts with the initialized graph with the item types and the RSCs and their capacities (S1010). For each requestable set c, if reservation requests have been accepted, the graph is updated with the accepted reservations, by creating an arc from source node s to node (c) (node corresponding to c) with capacity equal to the number of reservations q for the requestable set (S1020).

When all the requestable sets with reservations have been handled, the process is finished (S1030).

FIG. 11 shows the exemplary graph of FIG. 9 and the corresponding capacity matrix after it has been updated with the reservation data as shown on FIG. 4. Arcs beginning from node s represent the reservation requests and those arcs have a capacity equal to the number of reservation requests for the requestable set of characteristics at which the arc ends.

Reservation Data

| Hotel | Requestable characteristics | Reservations |
|---|---|---|
| H1 | LF & CV (P1) | 45 |
| H1 | HF & OV (P2) | 18 |
| H1 | LF & OV (P3) | 28 |
| H1 | OV | 0 |
| H1 | LF | 0 |

The reservations correspond to the characteristics LF & CV, HF & OV, LF & OV, which respectively correspond to the item types P1, P2 and P3. For each reservation request c, an arc is created from node s to node (c) with the capacity equal to the number of reservations for c: arc (s-P1) with capacity 45, arc (s-P2) with capacity 18, arc (s-P3) with capacity 28.

Figure 12:
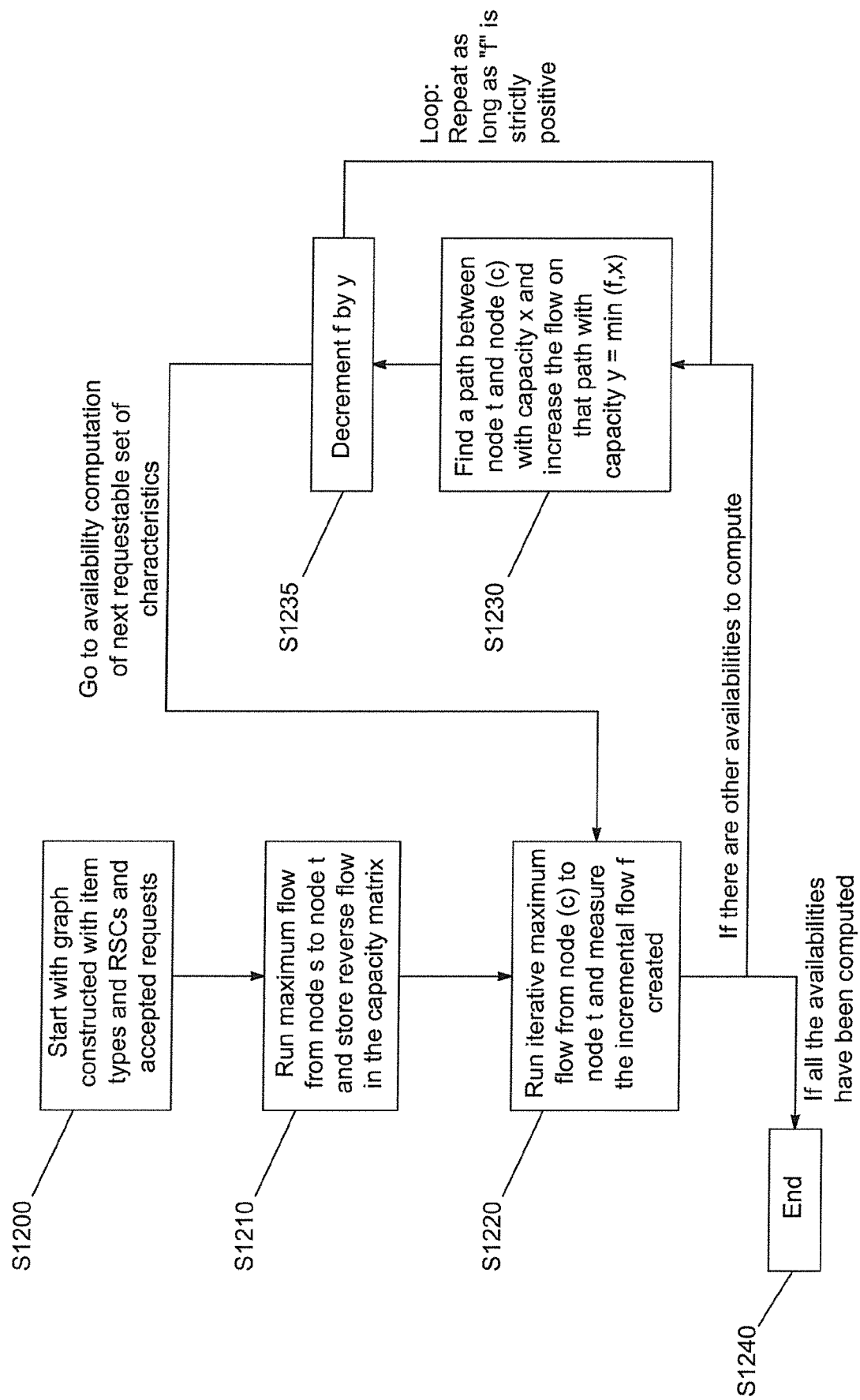
FIG. 12 shows the steps to compute the availability of a combination and to revert the flow to reuse the graph for a new availability computation.

FIG. 12 shows the steps to compute the availability of a requestable set of characteristics c and to put the graph in the correct state for another availability computation. The requestable set of characteristics c can be any item type or any RSC.

First, the graph is constructed with the item types, the RSCs and the accepted reservation requests (Si), as described on FIG. 11 (S1200).

To prepare the graph for an availability computation, the maximum flow is computed between the source node s and the target node t and the reverse flow is stored in the capacity matrix (S1210). A path connecting two nodes may be composed of one or several distinct arcs, each arc having a capacity greater than zero. The capacity of the path is the smallest capacity of all the arcs composing that path. Increasing a flow by a value f on a path means to increase a flow by a value f on each arc composing the path. The flow increased on an arc cannot exceed the capacity of the arc. When a flow on a path between connected nodes a-b-c is increased by a value f, the capacity on the arcs a-b and b-c is decremented by the value f. In the capacity matrix, increasing a flow by a value f between two connected nodes a and b means to decrement the value (matrix [a][b]) by the value "f", i.e. to execute the operation: matrix[a][b]=matrix[a][b]−f, and adding the reverse flow means to increment the value (matrix[b][a]) by the value "f", i.e. to execute the operation:

matrix[b] [a]=matrix[b][a]+f.

This is done as follows. While there is a path from source node s to target node t, the flow on the path is increased and the reverse flow is added on the graph (in dashed lines) and stored in the capacity matrix.

The reverse flow values show the paths on which the flow has been increased when the maximum flow algorithm was run. When increasing a flow by a value f on an arc, the corresponding reverse flow of value f is added to the capacity of the reverse arc. The reverse flow value shows the quantity of flow that has actually been increased on the arc and the value is kept in order to be able to undo this flow as needed. It may be needed to undo it in two cases, either within the maximum flow algorithm in order to find an alternative path between two nodes, or after the computation of an availability value in order to put the graph back in the correct state to compute the next availability value, as illustrated further below.

Figure 21A:
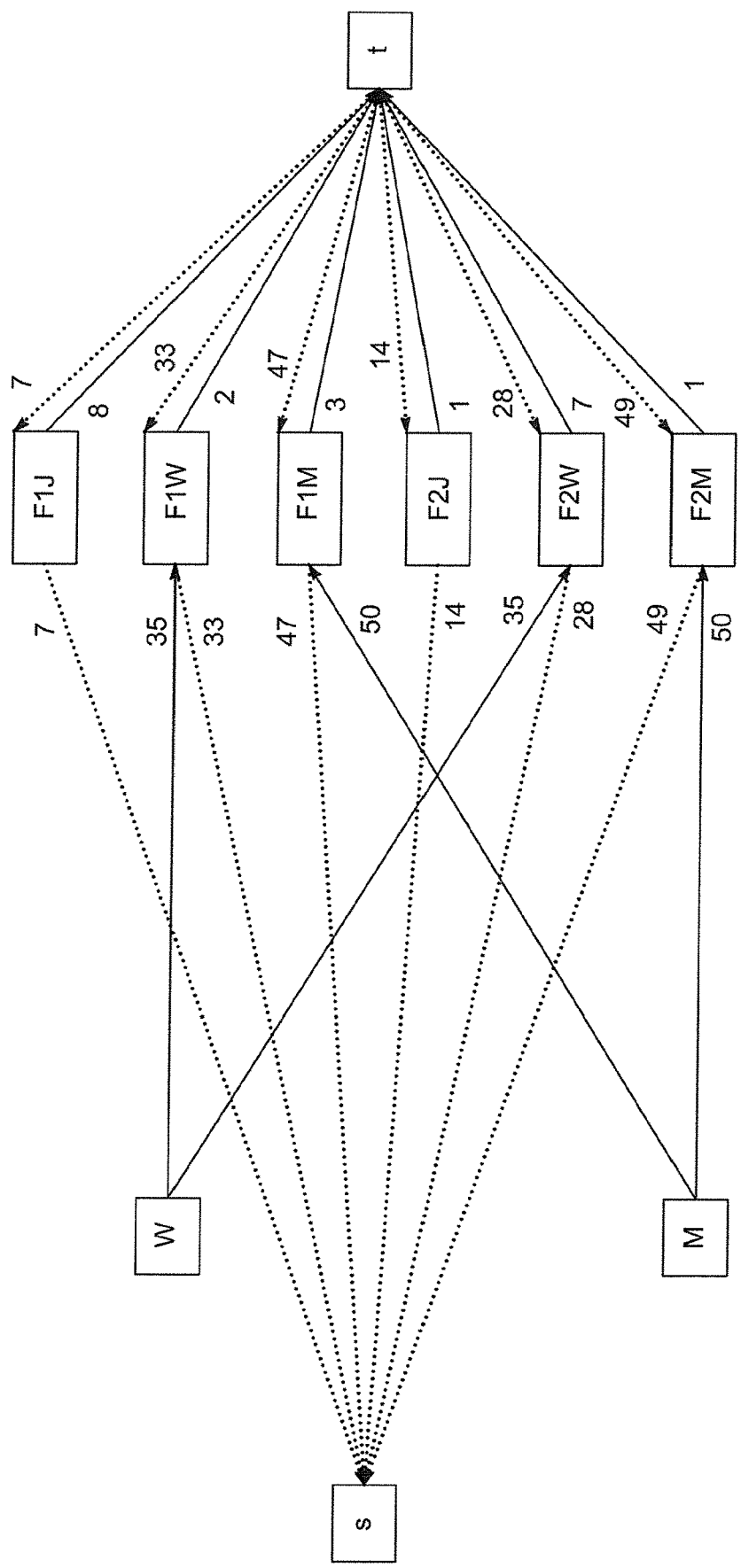
FIG. 21a shows the exemplary graph of FIG. 20a after running a maximum flow algorithm from node s to node t and storing the reverse flow in the capacity matrix. The graph is now in a state that, taking into account initial availabilities and accepted reservations, allows the computation of the availability of a requestable set of characteristics.
Figure 24A:
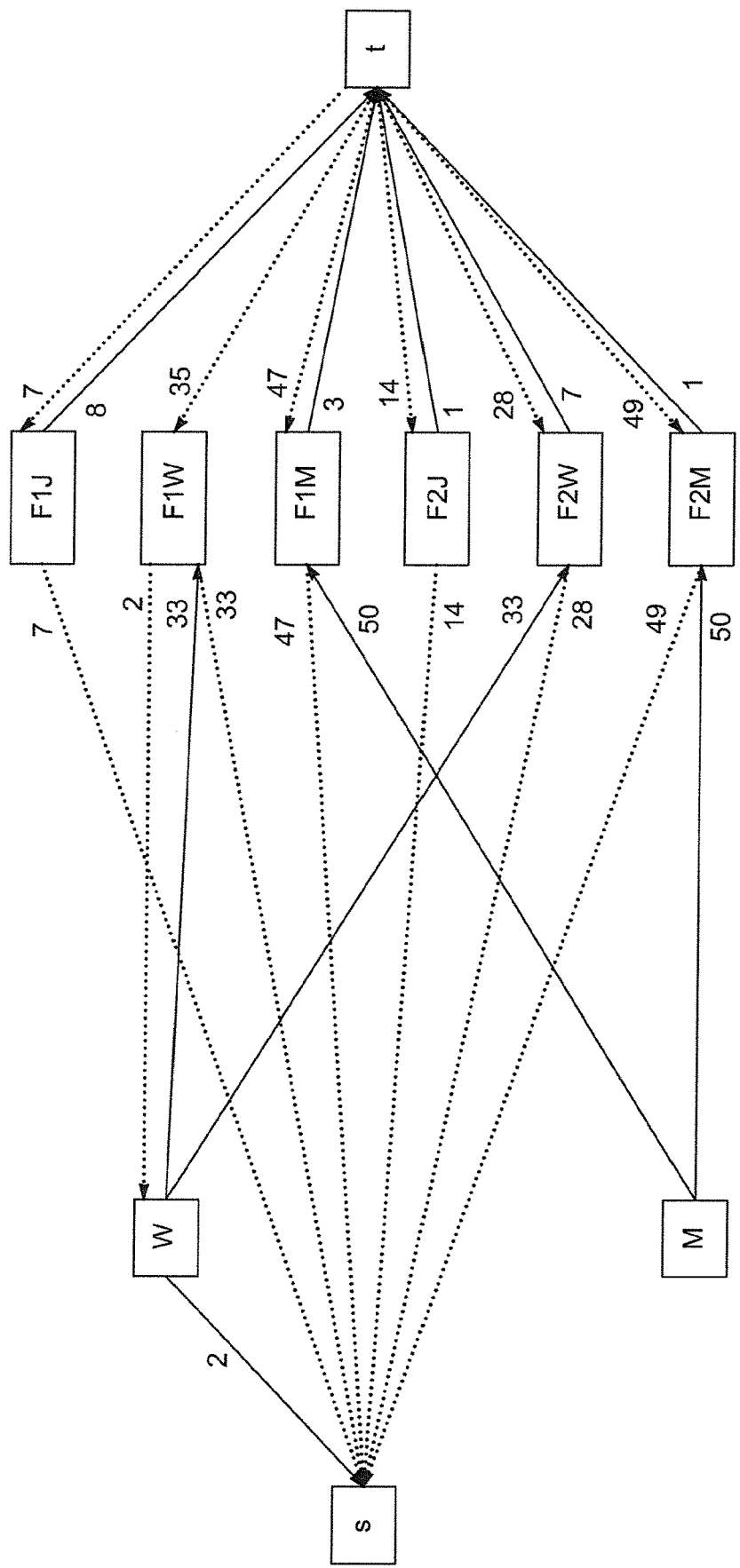
FIG. 24a shows the exemplary graph of FIG. 23a after running a maximum flow algorithm from node s to node t and storing the reverse flow in the capacity matrix. The graph is now in a state that, taking into account initial availabilities and accepted reservations including the new reservation for 2×W, allows the computation of the availability of a requestable set of characteristics.

The examples on FIGS. 13 and 16 (hotel) and FIGS. 21a and 24a (air) illustrate S1210. The dashed lines refer to the reverse flow.

To compute the availability of c, an iterative maximum flow is run from node (c) to target node t and the incremental flow f that is created is measured (S1220). This is done as follows: while there is a path between node (c) and target node t, the flow on the path is increased. The incremental flow added from node (c) to target node t is computed, resulting in the availability of c: f, as illustrated on FIGS. 14 and 17 (hotel) and FIGS. 22a and 25a (air).

If there are other availabilities to compute, the graph has to be reverted into a state equivalent to its state before the computation of the availability of c. The incremental flow is reverted by running an iterative bounded flow between target node t and node (c). The increased flow is capped by value f. This is done as follows. While f is greater than 0:

A path is taken from target node t to node (c) with capacity x and the flow on this path is increased with a value y=minimum (f, x) (S1230)

If is decremented by y (S1235).

Figure 26A:
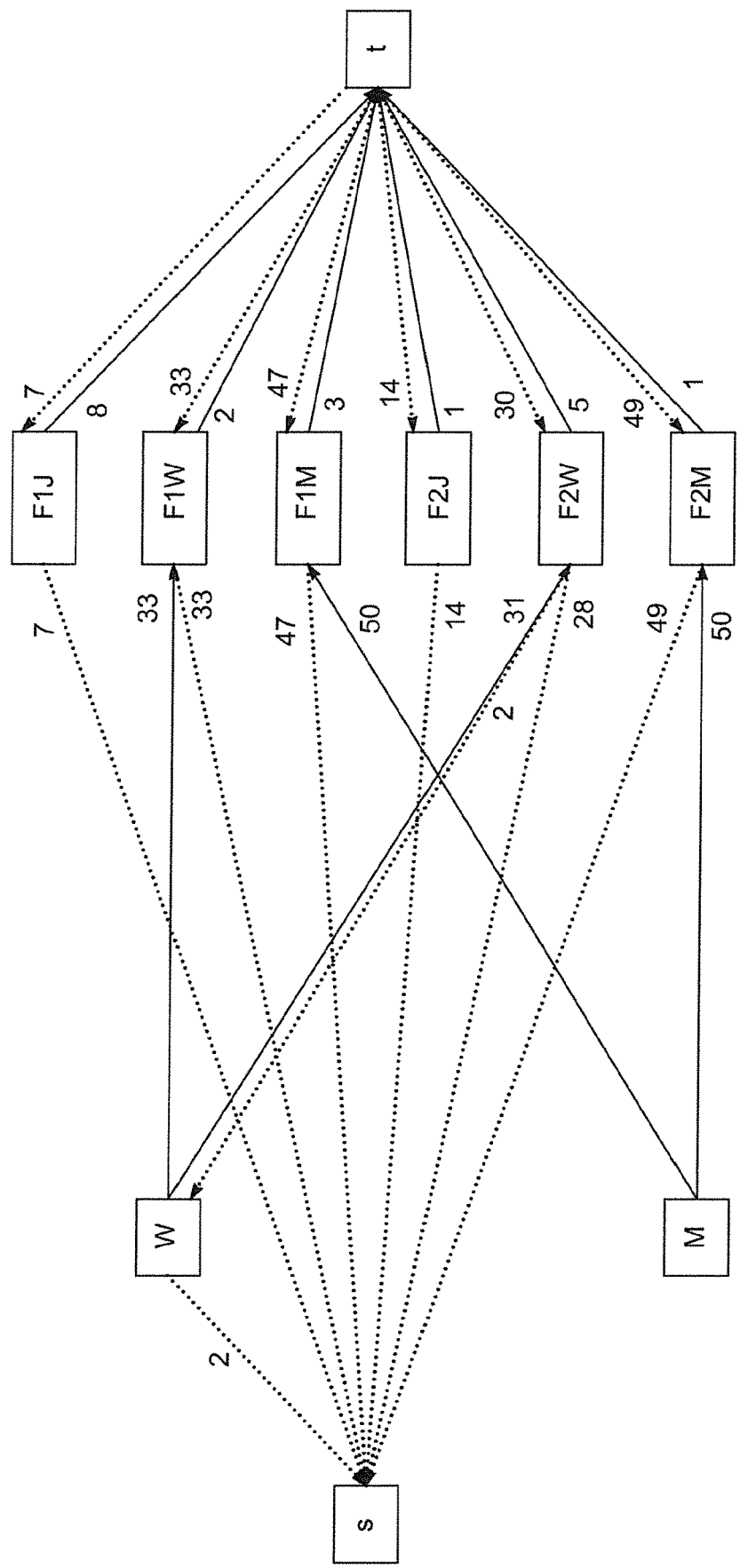
FIG. 26a shows the exemplary graph of FIG. 25a after it has been reverted to an equivalent state to that before the availability computation of W.

The examples on FIG. 18 (hotel) and FIG. 26a (air) illustrate this process.

The graph is thus returned to a state equivalent to its state before the availability computation of the requestable set of characteristics c and is ready to execute step S1220, i.e. to compute the availability of another set of characteristics. When the availabilities of all the requestable sets of characteristics have been computed, the process ends (S1240) and the availability values are sent to the shopping cache system FIG. 13 shows the exemplary graph of FIG. 11 and the corresponding capacity matrix after running a maximum flow algorithm from node s to node t and storing the reverse flow (shown by dashed lines on the graph) in the capacity matrix (S1210). While there is a path from source node s to target node t, the flow is increased on the path up to the capacity of the path:

For path s-P1-t:
        capacity arc (s-P1)=45; capacity arc (P1, t)=50
        →capacity path:min (capacity arc (s-P1), capacity arc (P1, t))=45.
        Increasing the flow on the path results in:
        capacity arc (s-P1)=0; capacity arc (P1, t)=5.
        The arc (s-P1) disappears and the capacity of arc (P1, t) becomes 5. The corresponding values in the capacity matrix are updated: matrix [s][P1]=0; matrix [P1][t]=5.
        The reverse flow is added on the graph in dashed lines: capacity (t-P1)=45; capacity (P1-s)=45. The corresponding values in the capacity matrix are updated: matrix [t][P1]=45; matrix [P1][s]=45.

For path s-P2-t:
    capacity arc (s-P2)=18; capacity arc (P2, t)=20
    →capacity path:min (capacity arc (s-P2), capacity arc (P2, t))=18.
    Increasing the flow on the path results in:
    capacity arc (s-P2)=0; capacity arc (P1, t)=2.
    The arc (s-P2) disappears and the capacity of arc (P2, t) becomes 2. The corresponding values in the capacity matrix are updated: matrix [s] [P2]=0; matrix [P2][t]=2.
    The reverse flow is added on the graph in dashed lines: capacity (t-P2)=18; capacity (P2-s)=18. The corresponding values in the capacity matrix are updated: matrix [t][P2]=18; matrix [P2][s]=18.

For path s-P3-t:
    capacity arc (s-P3)=28; capacity arc (P3, t)=30
    →capacity path:min (capacity arc (s-P3), capacity arc (P3, t))=28.
    Increasing the flow on the path results in:
    capacity arc (s-P3)=0; capacity arc (P3, t)=2.
    The arc (s-P3) disappears and the capacity of arc (P3, t) becomes 2. The corresponding values in the capacity matrix are updated: matrix [s][P3]=0; matrix [P3][t]=2.
    The reverse flow is added on the graph in dashed lines: capacity (t-P3)=28; capacity (P3-s)=28. The corresponding values in the capacity matrix are updated: matrix [t][P3]=28; matrix [P3][s]=28.

The maximum flow, corresponding to the number of reservations accepted, is 91. The graph and capacity matrix are now in a state, which, taking into account the initial availabilities and the accepted reservations, allows the computation of the availability of a requestable set of characteristics c (OV or LF).

FIG. 14 shows the exemplary graph of FIG. 13 and the corresponding capacity matrix after computing the availability of the requestable set of characteristics OV. The iterative maximum flow between node OV and node t is executed to compute the availability of OV (S1220 on FIG. 12). There are two paths between OV and t, i.e., via P2 and P3:

For path OV-P2-t:
    capacity arc (OV-P2)=20; capacity arc (P2, t)=2
    →capacity path:min (capacity arc (OV-P2), capacity arc (P2, t))=2.
    Increasing the flow on the path results in:
    capacity arc (OV-P2)=20−2=18; capacity arc (P2, t)=2−2=0.
    The capacity of arc (OV-P2) becomes 18 and the arc (P2, t) disappears. The corresponding values in the capacity matrix are updated: matrix [OV][P2]=18; matrix [P2][t]=0.

For path OV-P3-t:
    capacity arc (OV-P3)=30; capacity arc (P3, t)=2
    →capacity path:min (capacity arc (OV-P3), capacity arc (P3, t))=2.
    Increasing the flow on the path results in:
    capacity arc (OV-P3)=30−2=28; capacity arc (P3, t)=2−2=0.

The capacity of arc (OV-P3) becomes 28 and the arc (P3, t) disappears. The corresponding values in the capacity matrix are updated: matrix [OV] [P3] 28; matrix [P3] [t]=0.

The resulting total flow between node (OV) and target node t corresponds to the availability of OV and is 4. The reverse flow between target node t and node (OV) is represented on the graph in dashed lines and stored in the capacity matrix. For path t-P2-OV:
  Matrix [t][P2] is incremented by 2:18+2=20.
  Matrix [P2][OV] is incremented by 2:0+2=2.
  Before the availability computation of OV, 18 reservations for P2 were accepted.
  Reservation requests for OV can use the residual capacity of size 2 provided by P2.
For path t-P3-OV:
  Matrix [t][P3] is incremented by 2:28+2=30.
  Matrix [P3][OV] is incremented by 2:0+2=2.
  Before the availability computation of OV, 28 reservations for P3 were accepted.
  Reservation requests for OV can use the residual capacity of size 2 provided by P3.

FIG. 15 shows the exemplary graph of FIG. 11 and the corresponding capacity matrix after a reservation for two ocean-view rooms has been accepted. An arc is created from source node s to node (OV), with the capacity equal to the party size requested: 2. The capacity matrix is updated: matrix [s][OV]=2.

FIG. 16 shows the exemplary graph of FIG. 15 and the corresponding capacity matrix after running a maximum flow algorithm from source node s to target node t (step S1210 on FIG. 12), taking into account the newly accepted reservation request 2 OV, and adding the reverse flow in the capacity matrix. The maximum flow, which corresponds to the number of reservations accepted, is equal to 93. The graph is now in a state that, taking into account the initial availabilities and the accepted reservations including the new reservation for two ocean-view rooms, allows the computation of the availability of a requestable set of characteristics. To compute the availability of a requestable set of characteristics c, the iterative maximum flow between node (c) and target node t is computed. The flow is subsequently reverted so that the graph is in an equivalent state as its state before the availability computation. This computation is done for every node (c), and the availabilities thus obtained are sent to the availability cache system 140. The process is explained in detail in the example of FIG. 13. The person skilled in the art will easily be able to obtain the graph and capacity matrix of FIG. 16 by applying the steps explained in FIG. 13 on the graph and capacity matrix of FIG. 15.

FIG. 17 shows the exemplary graph of FIG. 16 and the corresponding capacity matrix after computing the availability of requestable subset of characteristics OV (step S1220 in FIG. 12). The iterative maximum flow between node (OV) and target node t is executed to compute the availability of OV. There is only one possible path between node (OV) and target node t in FIG. 16, which is via node (P3), with capacity 2. The maximum flow between node (OV) and target node t, representing the availability of OV, is equal to 2. The reverse flow is added in the capacity matrix: matrix [t][P3] is incremented by 2:28+2=30, and matrix [P3][OV] is incremented by 2:0+2=30. The process is explained in detail in the example of FIG. 14 and applies mutatis mutandis to FIG. 17.

FIG. 18 shows the exemplary graph of FIG. 17 and the corresponding capacity matrix after the loop over steps S1230 and S1235 in FIG. 12 has been performed, which revert the graph and capacity matrix to a state equivalent to the state before the availability computation of OV, and enable the availability computation of another set of characteristics. This is done by executing an iterative maximum flow algorithm bounded by the availability of OV (2). There are two possible paths from target node t to node (OV), both with capacity 2. If the flow on the path from target node t via node (P3) to node (OV) is increased up to the capacity of the path, the graph will be in exactly the same state A as on FIG. 16:
For path t-P3-OV:
  capacity arc (t-P3)=30; capacity arc (P3, OV)=2
  →capacity path:min (capacity arc (t-P3), capacity arc (P3, OV))=2.
  Increasing the flow on the path results in:
  capacity arc (t-P3)=30−2=28; capacity arc (P3, OV)=2−2=0.
  The capacity of arc (t-P3) becomes 28 and the arc (P3,OV) disappears. The corresponding values in the capacity matrix are updated: matrix [t][P3]28; matrix [P3][OV]=0.
If on the other hand the path between target node t via node (P2) to node (OV) is, the graph will be in a slightly different state B than on FIG. 16 as illustrated on FIG. 18:
For path t-P2-OV:
  capacity arc (t-P2)=20; capacity arc (P2, OV)=2
  →capacity path:min (capacity arc (t-P2), capacity arc (P2, OV))=2.
  Increasing the flow on the path results in:
  capacity arc (t-P2)=20−2=18; capacity arc (P2,OV)=2−2=0.
  The capacity of arc (t-P2) becomes 18 and the arc (P2,OV) disappears. The corresponding values in the capacity matrix are updated: matrix [t][P2]=18; matrix [P2][OV=0.
The graph and capacity matrix differ from the ones shown in FIG. 16, but they are equivalent to state A on FIG. 16. An availability computation of a set of characteristics will result in the same number whether the graph is in state A or B.

FIG. 19a shows an exemplary graph initialized with configuration data from FIG. 6.

Configuration Data

| Item type | Opaque product | Characteristics | Number of items |
|---|---|---|---|
| P1 | | F1J | 15 |
| P2 | | F1W | 35 |
| P3 | | F1M | 50 |
| P4 | | F2J | 15 |
| P5 | | F2W | 35 |
| P6 | | F2M | 50 |
| | OP1 | W | 70 |
| | OP2 | M | 100 |

This example is equivalent to the example illustrated in FIG. 9 and the person skilled in the art can obtain the graph presented here and the corresponding capacity matrix (FIG. 19b) by following the steps explained in FIG. 7.

FIG. 19b shows the capacity matrix corresponding to the graph of FIG. 19a.

Figure 20A:
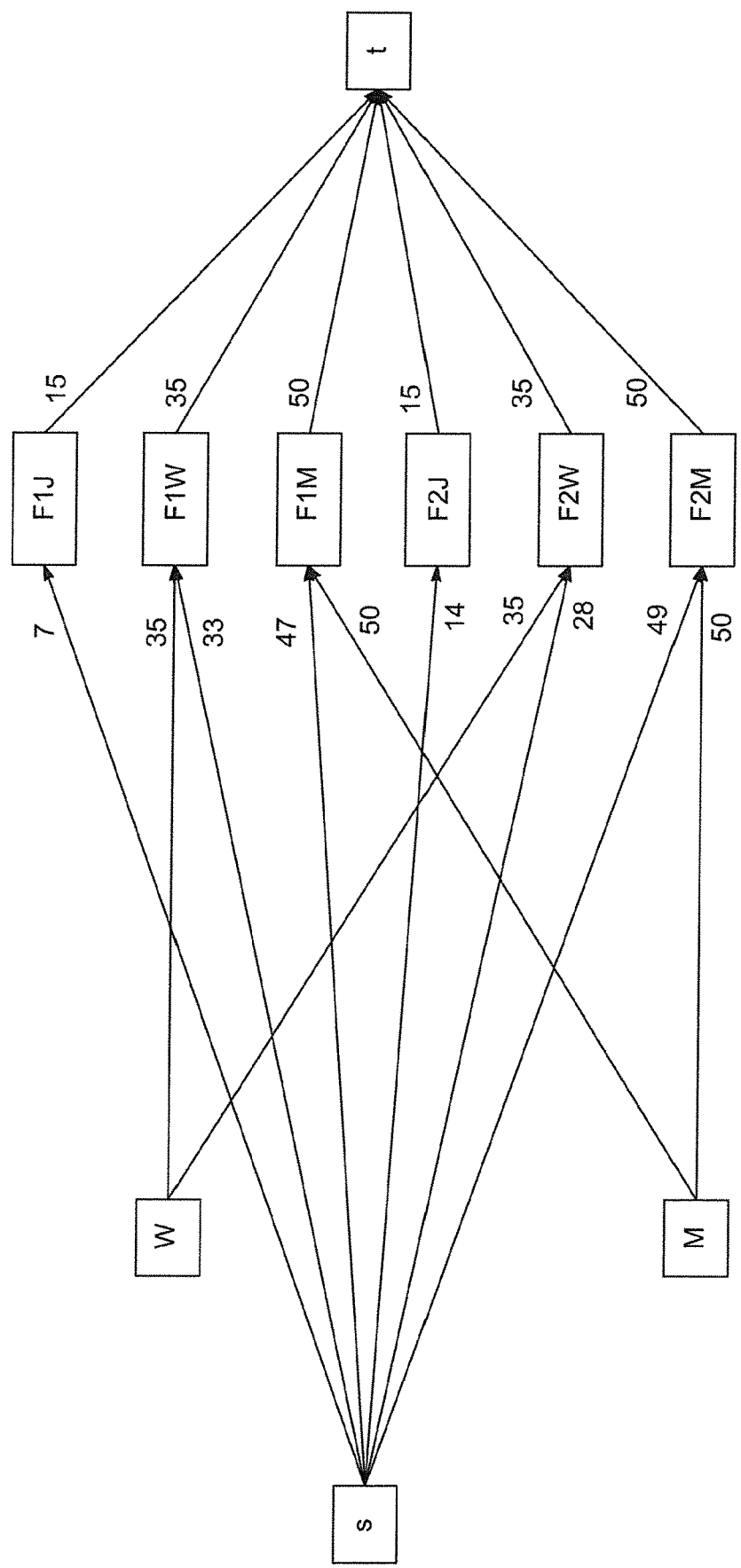
FIG. 20a shows the exemplary graph of FIG. 19a updated with accepted reservations.

FIG. 20a shows the exemplary graph of FIG. 19a updated with accepted reservations.

Reservation Data

| Requestable characteristics | Reservations |
|---|---|
| F1J | 7 |
| F1W | 33 |
| F1M | 47 |
| F2J | 14 |
| F2W | 28 |
| F2M | 49 |
| W | 0 |
| M | 0 |

This example is equivalent to the example illustrated in FIG. 11 and the person skilled in the art can obtain the graph presented here and the corresponding capacity matrix (FIG. 20b) by following the steps explained in FIG. 11.

FIG. 20b shows the capacity matrix corresponding to the graph of FIG. 20a.

FIG. 21a shows the exemplary graph of FIG. 20a after running a maximum flow algorithm from source node s to target node t and storing the reverse flow in the capacity matrix. The graph is now in a state that, taking into account initial availabilities and accepted reservations, allows the computation of the availability of a requestable set of characteristics. The process is explained in detail in the example of FIG. 13. The person skilled in the art will easily be able to obtain the graph and capacity matrix of FIG. 16 by applying the steps explained in FIG. 13 on the graph and capacity matrix of FIG. 15.

FIG. 21b shows the capacity matrix corresponding to the graph of FIG. 21a.

Figure 22A:
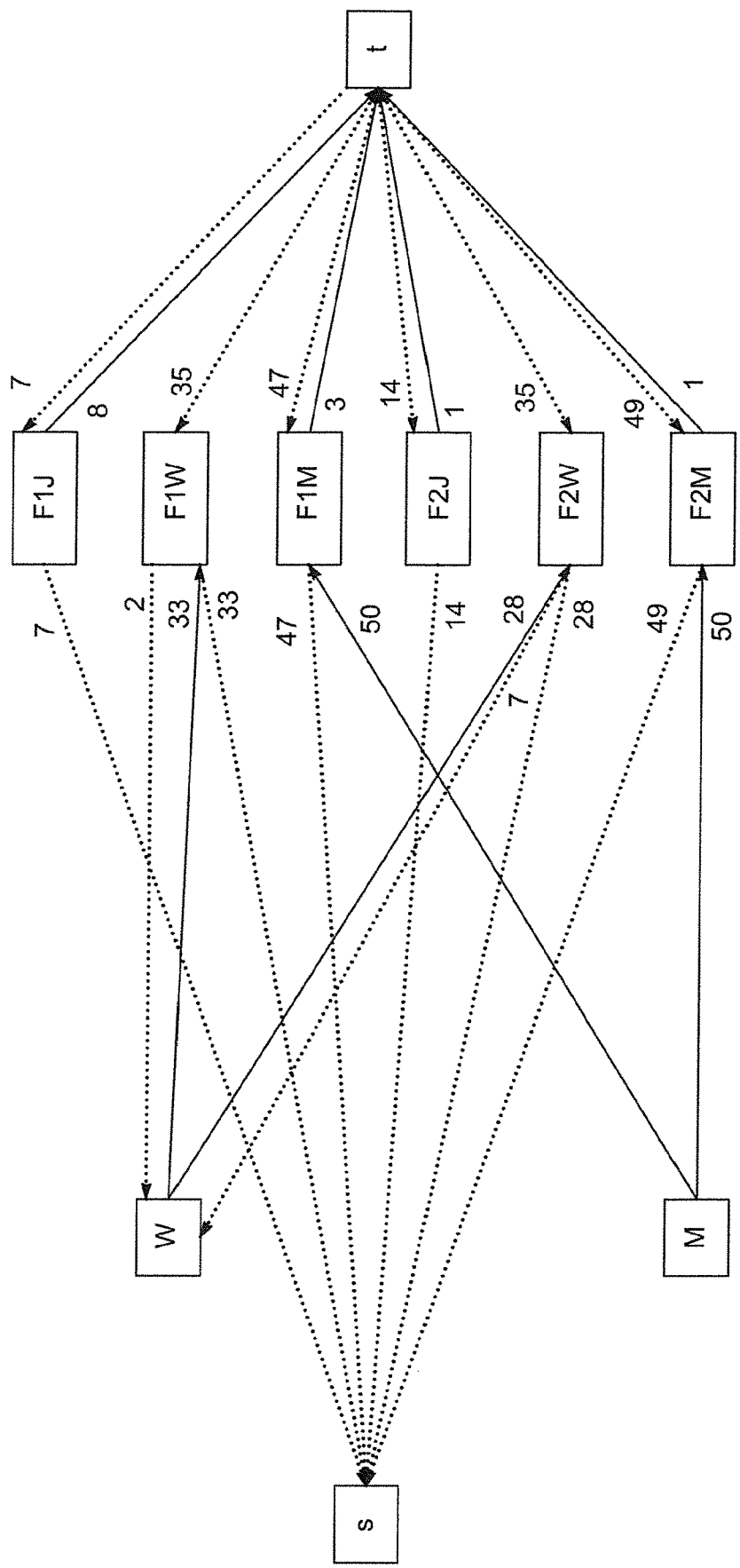
FIG. 22a shows the exemplary graph of FIG. 21a and the corresponding capacity matrix after running an iterative maximum flow algorithm from node W to node t to compute the availability of the requestable subset of characteristics W and storing the reverse flow in the capacity matrix.

FIG. 22a shows the exemplary graph of FIG. 21a after computing the availability of requestable subset of characteristics W, corresponding to a flight NCE-MAD in Premier Economy on a given date, with unknown departure time. The iterative maximum flow between node (W) and target node t is executed to compute the availability of W. The flow from node (W) via node (F1W) to target node t is 2. The flow from node (W) via node (F2W) to target node t is 7. The resulting total flow between node (W) and target node t corresponds to the availability of W is 9. In the capacity matrix, the reverse flow between target node t and node (W) is stored. For path t-F1W-W: matrix [t][F1W] is incremented by 2 (33+2=35) and matrix [F1W][W] is incremented by 2 (0+2=2). For path t-F2W-W, matrix [t][F2W] is incremented by 7 (28+7=35), and matrix [F2W][W] is incremented by 7 (0+7=7). The process is explained in detail in the example of FIG. 14 and applies mutatis mutandis to FIG. 22a.

FIG. 22b shows the capacity matrix corresponding to the graph of FIG. 22a.

Figure 23A:
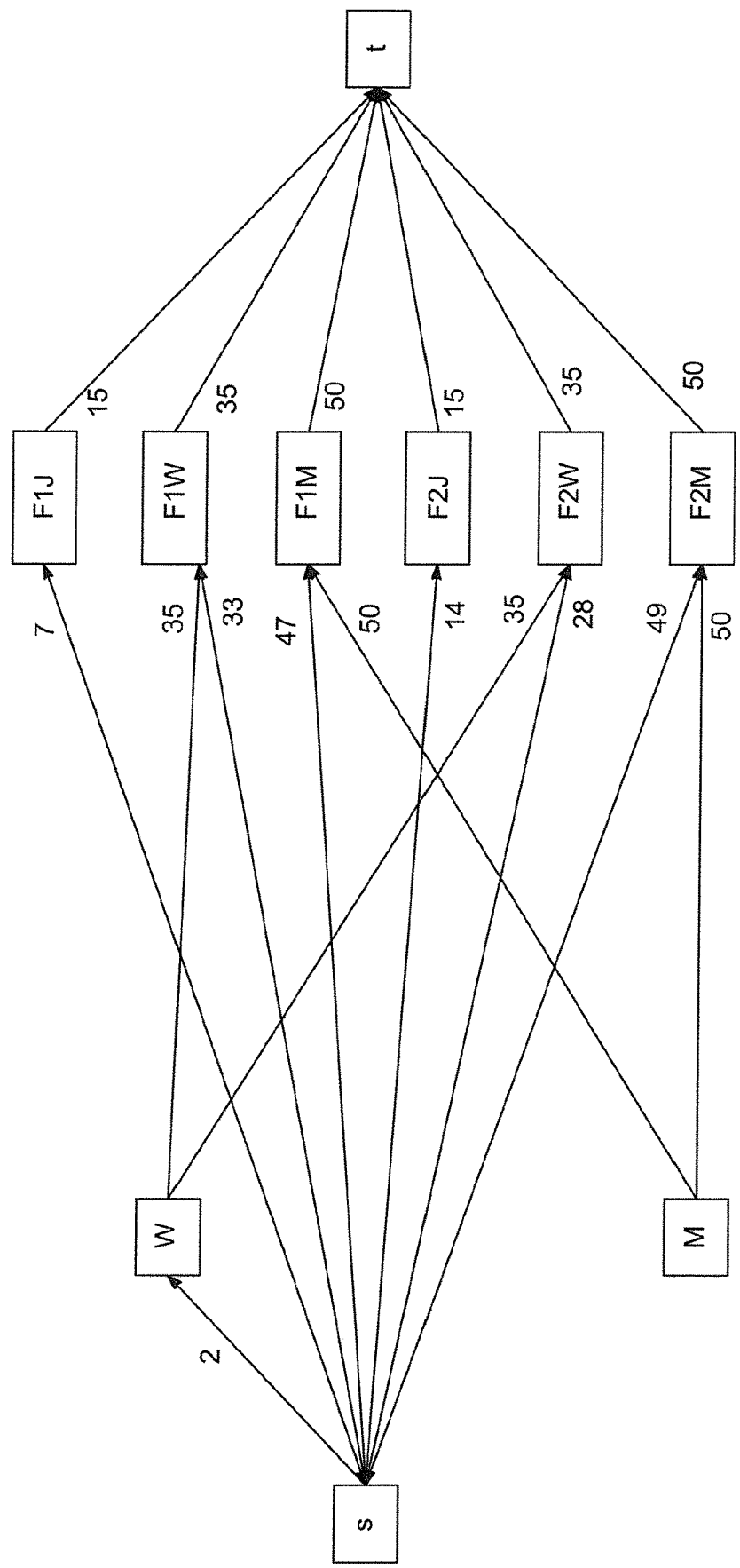
FIG. 23a shows the exemplary graph of FIG. 19a after a reservation for 2×W has been accepted.

FIG. 23a shows the exemplary graph of FIG. 19a after a reservation for W with party size 2 has been accepted. An arc is created from source node s to node (W), with the capacity equal to the party size requested: 2.

FIG. 23b shows the capacity matrix corresponding to the graph of FIG. 23a. The capacity matrix is updated: matrix [s][W]=2.

FIG. 24a shows the exemplary graph of FIG. 23a after running a maximum flow algorithm from source node s to target node t and storing the reverse flow in the capacity matrix. The graph is now in a state that, taking into account initial availabilities and accepted reservations including the new reservation for 2 W (two flights NCE-MAD in Premier Economy on a given date, with unknown departure time), allows the computation of the availability of a requestable set of characteristics. The process is explained in detail in the example of FIG. 13. The person skilled in the art will easily be able to obtain the graph of FIG. 24a and the capacity matrix of FIG. 24b by applying the steps explained in FIG. 13 on the graph of FIG. 23a and the capacity matrix of FIG. 23b.

FIG. 24b shows the capacity matrix corresponding to the graph of FIG. 24a.

Figure 25A:
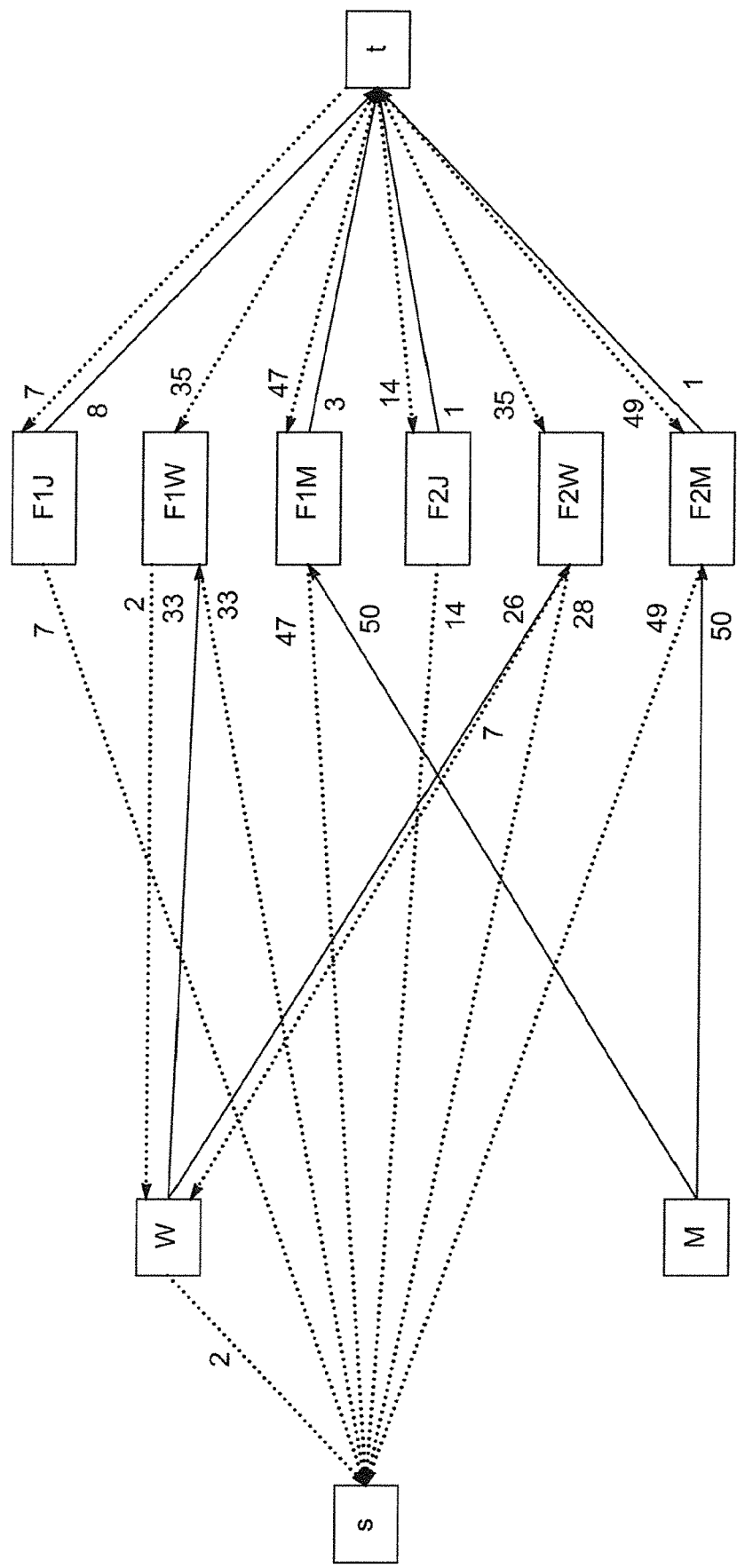
FIG. 25a shows the exemplary graph of FIG. 24a after running an iterative maximum flow algorithm from node W to node t to compute the availability of the requestable subset of characteristics W and storing the reverse flow in the capacity matrix.

FIG. 25a shows the exemplary graph of FIG. 24a after computing the availability of requestable subset of characteristics W, corresponding to a flight NCE-MAD in Premier Economy on a given date, with unknown departure time. The iterative maximum flow between node (W) and target node t is executed to compute the availability of W. There is only one possible path from node (W) to target node t, namely via node (F2W). The flow from node (W) via node (F2W) to target node t is 7 and corresponds to the availability of W. In the capacity matrix, the reverse flow between t and W is stored: matrix [t][F2W] is incremented by 7 (28+7=35) and matrix [F2W][W] is incremented by 7 (0+7=7). The process is explained in detail in the example of FIG. 14 and applies mutatis mutandis to FIG. 25a.

FIG. 25b shows the capacity matrix corresponding to the graph of FIG. 25a.

FIG. 26a shows the exemplary graph of FIG. 25a after it has been reverted to an equivalent state to that before the availability computation of W. This is done by executing an iterative maximum flow algorithm bounded by the availability of W (7). There are two possible paths from target node t to node (W), namely via node (F1W) (capacity 2) and via node (F2W) (capacity 7). If the flow on the path via node (F2W) is increased up to the capacity of the path, the graph will be in exactly the same state A as on FIG. 24a. If the flow on the path via node (F1W) is first increased (2) and subsequently the flow on the path via node (F2W) is (partly) increased (capped by 7−2=5), the graph will be in a slightly different state B than on FIG. 24a but it will be equivalent to state A. An availability computation of a set of characteristics will result in the same number whether the graph is in state A or B. The process is explained in detail in FIG. 18 and applies mutatis mutandis to FIG. 26a.

FIG. 26b shows the capacity matrix corresponding to the graph of FIG. 26a.

Figure 27:
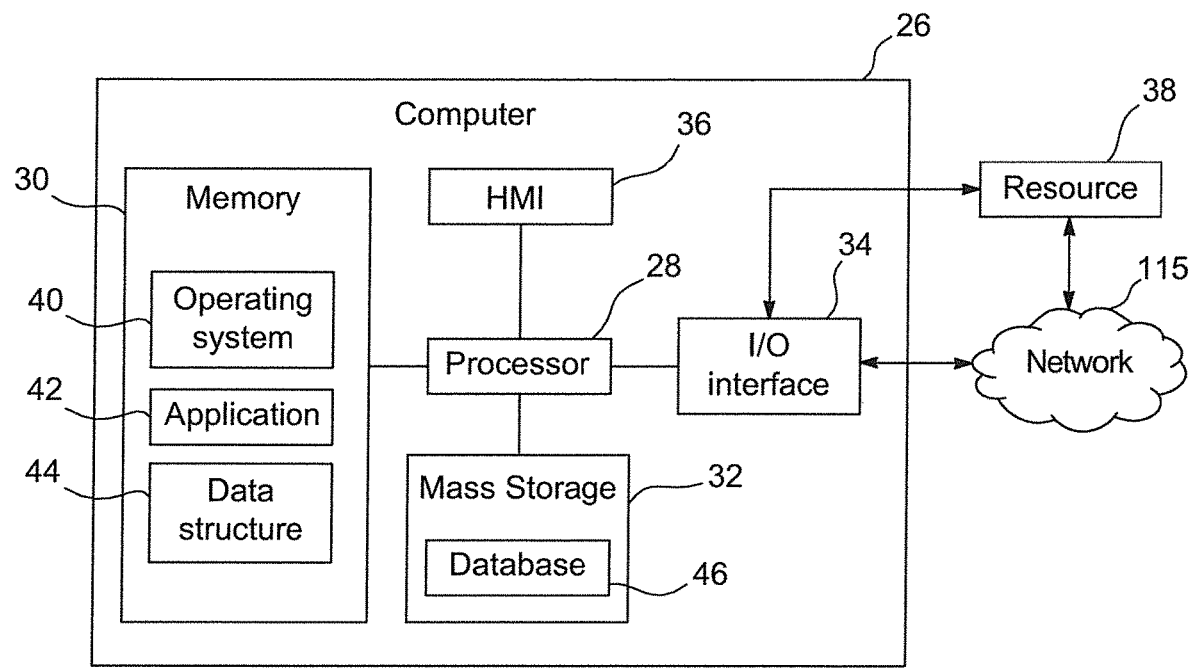
FIG. 27 is a diagrammatic view of an exemplary computer system.

Referring now to FIG. 27, the systems, platforms, modules, units, etc. described herein may be implemented on one or more computing devices or systems, such as exemplary computer system 26. The computer system 26 may include a processor 28, a memory 30, a mass storage memory device 32, an input/output (I/O) interface 34, and a Human Machine Interface (HMI) 36. The computer system 26 may also be operatively coupled to one or more external resources 38 via the network 115 or I/O interface 34. External resources may include, but are not limited to, servers, databases, mass storage devices, peripheral devices, cloud-based network services, or any other suitable computer resource that may be used by the computer system 26.

The processor 28 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 30. Memory 30 may include a single memory device or a plurality of memory devices including, but not limited, to read-only memory (ROM), random access memory (RAM), volatile memory, non-volatile memory, static random access memory (SRAM), dynamic random access memory (DRAM), flash memory, cache memory, or any other device capable of storing information. The mass storage memory device 32 may include data storage devices such as a hard drive, optical drive, tape drive, non-volatile solid state device, or any other device capable of storing information.

Processor 28 may operate under the control of an operating system 40 that resides in memory 30. The operating system 40 may manage computer resources so that computer program code embodied as one or more computer software applications, such as an application 42 residing in memory 30, may have instructions executed by the processor 28. In an alternative embodiment, the processor 28 may execute the application 42 directly, in which case the operating system 40 may be omitted. One or more data structures 44 may also reside in memory 30, and may be used by the processor 28, operating system 40, or application 42 to store or manipulate data.

The I/O interface 34 may provide a machine interface that operatively couples the processor 28 to other devices and systems, such as the network 115 or external resource 38. The application 42 may thereby work cooperatively with the network 115 or external resource 38 by communicating via the I/O interface 34 to provide the various features, functions, applications, processes, or modules comprising embodiments of the invention. The application 42 may also have program code that is executed by one or more external resources 38, or otherwise rely on functions or signals provided by other system or network components external to the computer system 26. Indeed, given the nearly endless hardware and software configurations possible, persons having ordinary skill in the art will understand that embodiments of the invention may include applications that are located externally to the computer system 26, distributed among multiple computers or other external resources 38, or provided by computing resources (hardware and software) that are provided as a service over the network 115, such as a cloud computing service.

The HMI 36 may be operatively coupled to the processor 28 of computer system 26 in a known manner to allow a user to interact directly with the computer system 26. The HMI 36 may include video or alphanumeric displays, a touch screen, a speaker, and any other suitable audio and visual indicators capable of providing data to the user. The HMI 36 may also include input devices and controls such as an alphanumeric keyboard, a pointing device, keypads, push-buttons, control knobs, microphones, etc., capable of accepting commands or input from the user and transmitting the entered input to the processor 28.

A database 46 may reside on the mass storage memory device 32, and may be used to collect and organize data used by the various systems and modules described herein. The database 46 may include data and supporting data structures that store and organize the data. In particular, the database 46 may be arranged with any database organization or structure including, but not limited to, a relational database, a hierarchical database, a network database, or combinations thereof. A database management system in the form of a computer software application executing as instructions on the processor 28 may be used to access the information or data stored in records of the database 46 in response to a query, where a query may be dynamically determined and executed by the operating system 40, other applications 42, or one or more modules.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions which are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

Various program code described herein may be identified based upon the application within which it is implemented in specific embodiments of the invention. However, it should be appreciated that any particular program nomenclature that follows is used merely for convenience, and thus the embodiments of invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flowcharts, sequence diagrams, and/or block diagrams.

In certain alternative embodiments, the functions, acts, and/or operations specified in the flowcharts, sequence diagrams, and/or block diagrams may be re-ordered, processed serially, and/or processed concurrently consistent with embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

The invention claimed is:

1. A computer-implemented virtualization method for optimizing, through a client-server processing system, an availability of items in an inventory of items in a central reservation system, wherein the central reservation system comprises a reservation system in communication with a reservation database, a configuration system in communication with a configuration database, and an availability cache system in communication with a cache memory, wherein the items are classified into item types, the method comprising:
   (1) the reservation system receiving, from the configuration database, a list of items and the corresponding item types;
   (2) the reservation system defining the item types as requestable sets of at least one characteristic;
   (3) the reservation system determining initial availabilities based on the requestable sets of at least one characteristic;
   (4) the reservation system obtaining a record of existing reservations for (i) each set of the requestable sets of at least one characteristic, and (ii) each partial set of characteristics;
   (5) the reservation system updating a set of availabilities based on the initial availabilities and the record of existing reservations to reflect updated availabilities for (i) each set of characteristics, and (ii) each partial set of characteristics;
   (6) the reservation system receiving a reservation request for a set of at least one characteristic;
   (7) the reservation system computing the availability of the requested set based on the updated set of availabilities;
   (8) a. the reservation system, in response to determining that the requested set is available:
      i. accepting the reservation request by storing a reservation for the requested set in the reservation database,
      ii. updating the availabilities of the requestable sets taking into account the accepted reservation request,
      iii. sending the updated availabilities to the availability cache system,
      iv. receiving the updated availabilities at the availability cache system, and
      v. in response to receiving the updated availabilities, refreshing zones of the cache memory under the supervision of the availability cache system based on the updated availabilities;
   b. the reservation system, in response to determining that the requested set is not available, declining the reservation request; and
   (9) the reservation system iterating steps (6) to (8) for subsequent reservation requests for requestable sets.

2. The method of claim 1, wherein the requestable sets include sets of characteristics defining item types and other predefined sets of characteristics.

3. The method of claim 2, wherein at least one of the predefined set of characteristics is a subset of a set of characteristics defining an item type.

4. The method of claim 1, the method further comprising:
   the reservation system, prior to determining the initial availabilities, receiving a predefined list of requestable sets of at least one characteristic that are subsets of the defined sets of at least one characteristic; and
   identifying, from the list of requestable sets, requestable subsets that comprise fewer requestable characteristics than all the requestable characteristics of an item type.

5. The method of claim 1, wherein the reservation request has a party size p for a set c, and accepting the reservation request and updating the availabilities of the requestable sets taking into account the accepted reservation requests, executed by the reservation system, comprises:
   (1) incrementing a number of reservations in the reservation database for requestable set c by p;
   (2) constructing a graph of N nodes, wherein N=2+ number of item types+number of requestable subsets, and the graph is composed of a source node s, a target node t, a node (n) per item type n and a node (m) per requestable subset of characteristics m;
   (3) initializing the graph by:
   for each item type n, creating an arc from node (n) to target node t, with a capacity equal to the capacity of a set of characteristics of item type n;

for each requestable subset m:
  enumerating the item types k containing the requestable subset m;
  creating, for each item type k, an arc from node (m) to node (k) with a capacity equal to the capacity of a set of characteristics of item type k;
(4) retrieving the reservations from the reservation database and updating the graph with the accepted reservation requests, by, for each requestable set j with a number of reservations q, creating an arc from source node s to node (j) with capacity q;
(5) running a maximum flow algorithm from source node s to target node t and adding a reverse flow on the graph; and
(6) for each requestable set i:
(i) running an iterative maximum flow from node (i) to target node t and measuring the incremental flow created, comprising:
  while there is a path between node (i) and target node t, increasing flow g on the path;
  summing all the flows g, resulting in availability f of the requestable set i; and
(ii) while i is not the last requestable set for which the availability is to be computed, running an iterative bounded flow capped by the availability f between target node t and node (i), comprising increasing flows on at least one path from target node t to node (i) up to availability f.

6. The method of claim 5, further comprising:
optimizing, at the reservation system, the graph by connecting requestable subset nodes with arcs to other requestable subset nodes.

7. The method of claim 6, wherein the graph has the capacity set on the nodes instead of the arcs, or on both.

8. The method of claim 1, wherein the reservation system is a hotel reservation system and the item types are hotel room types or other bookable products.

9. The method of claim 1, wherein the reservation system is a flight reservation system and the item types are bookable places on flights.

10. The method of claim 1, wherein determining the initial availabilities is based on an availability computation, wherein the availability computation of a requestable set c, executed by the reservation system, comprises:
constructing a graph of N nodes, wherein N=2+number of item types+number of requestable subsets, and the graph is composed of a source node s, a target node t, a node (n) per item type n and a node (m) per requestable subset of characteristics m;
initializing the graph by:
  for each item type n, creating an arc from node (n) to target node t, with a capacity equal to the capacity of a set of characteristics of item type n, and
  for each requestable subset m:
    enumerating item types k containing the requestable subset m, and
    creating, for each item type k, an arc from node (m) to node (k) with a capacity equal to the capacity of a set of characteristics of item type k;
for each requestable set z, if reservation requests have been accepted, updating the graph with the accepted reservation requests, by creating an arc from source node s to node (z) with capacity equal to a number of reservations for the requestable set z;
running a maximum flow algorithm from source node s to target node t and adding a reverse flow on the graph; and running an iterative maximum flow from node (c) to target node t and measuring an incremental flow created, comprising:
  while there is a path between node (c) and target node t, increasing flow j on the path, and
  summing all the flows j, resulting in the availability f of the requestable set c.

11. The method of claim 10, wherein the graph is stored in the cache memory as a capacity matrix.

12. The method of claim 1 wherein the items in the inventory in the central reservation system are opaque products that are not allocated or reassigned at the time that the reservation request is received in order to accommodate the reservation request, and further comprising:
assigning one of the items in the inventory in the central reservation system in response to a check-in event that fulfills the reservation request.

13. A computer system for optimizing, through a client-server processing system, an availability of items in an inventory of items in a central reservation system, wherein the central reservation system comprises a reservation system in communication with a reservation database, a configuration system in communication with a configuration database, and an availability cache system in communication with a cache memory, wherein the items are classified into item types, the computer system comprising:
a memory; and
a processor interconnected with the memory, the processor configured to:
(1) receive a list of items and the corresponding item types;
(2) define the item types as requestable sets of at least one characteristic;
(3) determine initial availabilities based on the requestable sets of at least one characteristic;
(4) obtain a record of existing reservations for (i) each set of the requestable sets of at least one characteristic, and (ii) each partial set of characteristics;
(5) update a set of availabilities based on the initial availabilities and the record of existing reservations to reflect updated availabilities for (i) each set of characteristics, and (ii) each partial set of characteristics;
(6) receive a reservation request for a set of at least one characteristic;
(7) compute the availability of the requested set based on the updated set of availabilities;
(8) a. in response to determining that the requested set is available:
  i. accept the reservation request by storing a reservation for the requested set in the reservation database,
  ii. updating the availabilities of the requestable sets taking into account the accepted reservation request,
  iii. sending the updated availabilities to the availability cache system,
  iv. receiving the updated availabilities at the availability cache system; and
  v. in response to receiving the updated availabilities, refreshing zones of the cache memory under the supervision of the availability cache system based on the updated availabilities;
  b. in response to determining that the requested set is not available, declining the reservation request; and
(9) iterate steps (6) to (8) for subsequent reservation requests for requestable sets.

14. The computer system of claim 13, wherein the requestable sets include sets of characteristics defining item types and other predefined sets of characteristics.

15. The computer system of claim 14, wherein at least one of the predefined set of characteristics is a subset of a set of characteristics defining an item type.

16. The computer system of claim 13, wherein the processor is further configured to:
the reservation system, prior to determining the initial availabilities, receiving a predefined list of requestable sets of at least one characteristic that are subsets of the defined sets of at least one characteristic; and
identifying, from the list of requestable sets, requestable subsets that comprise fewer requestable characteristics than all the requestable characteristics of an item type.

17. The computer system of claim 13, wherein determining the initial availabilities is based on an availability computation, wherein the availability computation of a requestable set c, executed by the reservation system, comprises:
constructing a graph of N nodes, wherein N=2+number of item types+number of requestable subsets, and the graph is composed of a source node s, a target node t, a node (n) per item type n and a node (m) per requestable subset of characteristics m;
initializing the graph by:
for each item type n, creating an arc from node (n) to target node t, with a capacity equal to the capacity of a set of characteristics of item type n, and
for each requestable subset m:
enumerating item types k containing the requestable subset m, and
creating, for each item type k, an arc from node (m) to node (k) with a capacity equal to the capacity of a set of characteristics of item type k;
for each requestable set z, if reservation requests have been accepted, updating the graph with the accepted reservation requests, by creating an arc from source node s to node (z) with capacity equal to a number of reservations for the requestable set z;
running a maximum flow algorithm from source node s to target node t and adding a reverse flow on the graph; and
running an iterative maximum flow from node (c) to target node t and measuring an incremental flow created, comprising:
while there is a path between node (c) and target node t, increasing flow j on the path, and
summing all the flows j, resulting in the availability f of the requestable set c.

18. The computer system of claim 13, wherein the reservation request has a party size p for a set c, and accepting the reservation request and updating the availabilities of the requestable sets taking into account the accepted reservation requests, executed by the reservation system, comprises:
(1) incrementing a number of reservations in the reservation database for requestable set c by p;
(2) constructing a graph of N nodes, wherein N=2+number of item types+number of requestable subsets, and the graph is composed of a source node s, a target node t, a node (n) per item type n and a node (m) per requestable subset of characteristics m;
(3) initializing the graph by:
for each item type n, creating an arc from node (n) to target node t, with a capacity equal to the capacity of a set of characteristics of item type n;
for each requestable subset m:
enumerating the item types k containing the requestable subset m;
creating, for each item type k, an arc from node (m) to node (k) with a capacity equal to the capacity of a set of characteristics of item type k;
(4) retrieving the reservations from the reservation database and updating the graph with the accepted reservation requests, by, for each requestable set j with a number of reservations q, creating an arc from source node s to node (j) with capacity q;
(5) running a maximum flow algorithm from source node s to target node t and adding a reverse flow on the graph; and
(6) for each requestable set i:
(i) running an iterative maximum flow from node (i) to target node t and measuring the incremental flow created, comprising:
while there is a path between node (i) and target node t, increasing flow g on the path;
summing all the flows g, resulting in availability f of the requestable set i; and
(ii) while i is not the last requestable set for which the availability is to be computed, running an iterative bounded flow capped by the availability f between target node t and node (i), comprising increasing flows on at least one path from target node t to node (i) up to availability f.

19. The computer system of claim 18, wherein the processor is further configured to:
optimize, at the reservation system, the graph by connecting requestable subset nodes with arcs to other requestable subset nodes, wherein the graph has the capacity set on the nodes instead of the arcs, or on both.

20. A computer program product including a non-transitory computer readable medium, the non-transitory computer readable medium storing instructions which, when executed by a computing device for handling reservation requests corresponding to an inventory of items classified as a plurality of item types, each item having one of the plurality of item types, and each item type defined by a respective set of characteristics, cause the computing device to:
(1) receive, from a configuration database, a list of items and the corresponding item types;
(2) define the item types as requestable sets of at least one characteristic;
(3) determine initial availabilities based on the requestable sets of at least one characteristic
(4) obtain a record of existing reservations for (i) each set of the requestable sets of at least one characteristic, and (ii) each partial set of characteristics;
(5) update a set of availabilities based on the initial availabilities and the record of existing reservations to reflect updated availabilities for (i) each set of characteristics, and (ii) each partial set of characteristics;
(6) receive a reservation request for a set of at least one characteristic;
(7) compute the availability of the requested set;
(8) a. in response to determining that the requested set is available:
i. accept the reservation request by storing a reservation for the requested set in a reservation database,
ii. updating the availabilities of the requestable sets taking into account the accepted reservation request,
iii. sending the updated availabilities to an availability cache system,
iv. receiving the updated availabilities at the availability cache system, and v. in response to receiving the updated availabilities, refreshing zones of the cache memory under the supervision of the availability cache system based on the updated availabilities;
b. in response to determining that the requested set is not available, declining the reservation request; and
(9) iterate steps (6) to (8) for subsequent reservation requests for requestable sets.

\* \* \* \* \*